(12) United States Patent
Seki et al.

(10) Patent No.: US 11,267,316 B2
(45) Date of Patent: Mar. 8, 2022

(54) AIR CONDITIONING CONTROL DEVICE, AIR CONDITIONING CONTROL METHOD, AND PROGRAM

(71) Applicant: HONDA MOTOR CO., LTD., Tokyo (JP)

(72) Inventors: Kazuhiko Seki, Wako (JP); Subaru Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 16/561,178

(22) Filed: Sep. 5, 2019

(65) Prior Publication Data
US 2020/0122549 A1  Apr. 23, 2020

(30) Foreign Application Priority Data
Oct. 23, 2018 (JP) .............................. JP2018-199347

(51) Int. Cl.
*B60H 1/00* (2006.01)
*B60W 40/08* (2012.01)
(Continued)

(52) U.S. Cl.
CPC ......... *B60H 1/00807* (2013.01); *B60W 10/30* (2013.01); *B60W 30/025* (2013.01); *B60W 40/08* (2013.01)

(58) Field of Classification Search
CPC .................. B60H 1/00807; B60W 10/30
See application file for complete search history.

(56) References Cited

U.S. PATENT DOCUMENTS

| 9,251,631 | B2* | 2/2016 | Thompson | .............. B60L 58/12 |
| 2016/0059733 | A1* | 3/2016 | Hettrich | ................ H04W 4/029 |
| | | | | 701/2 |

(Continued)

FOREIGN PATENT DOCUMENTS

| JP | 09-109648 | 4/1997 |
| JP | 2006-347295 | 12/2006 |

(Continued)

OTHER PUBLICATIONS

Japanese Office Action for Japanese Patent Application No. 2018-199347 dated Oct. 5, 2021.

*Primary Examiner* — Jess Whittington
(74) *Attorney, Agent, or Firm* — Amin, Turocy & Watson, LLP

(57) ABSTRACT

An air conditioning control device acquires environmental measurement information, acquires an action schedule of a user of a host vehicle on the basis of past or future schedule table information of the user, and estimates a boarding time at which the user gets on the host vehicle, a destination, and a route based on the action schedule. The control device then derives an instruction value pattern that includes a first instruction value for the air conditioning device at the boarding time, a second instruction value for the air conditioning device in a travel route toward the destination, and a third instruction value for the air conditioning device in a case that the user gets on after getting off the vehicle, based on the environmental measurement information. An air conditioning controller controls an air conditioning device of the host vehicle based on the instruction value pattern.

10 Claims, 18 Drawing Sheets

(51) Int. Cl.
B60W 30/02 (2012.01)
B60W 10/30 (2006.01)

(56) References Cited

U.S. PATENT DOCUMENTS

| | | | |
|---|---|---|---|
| 2017/0072966 A1 | 3/2017 | Bolger et al. | |
| 2017/0210390 A1* | 7/2017 | Porras | B60W 50/0098 |
| 2018/0272878 A1* | 9/2018 | Lee | B60L 53/68 |
| 2019/0061545 A1* | 2/2019 | Vargas-Reighley | B60L 58/13 |
| 2020/0307352 A1* | 10/2020 | Boston | B60H 1/00357 |
| 2021/0053515 A1* | 2/2021 | Dombrovskis | B60Q 3/80 |

FOREIGN PATENT DOCUMENTS

| | | |
|---|---|---|
| JP | 2011-255686 | 12/2011 |
| JP | 2017-159691 | 9/2017 |
| WO | 2017/119150 | 7/2017 |

* cited by examiner

FIG. 3

REGULAR TRAVEL PROFILE 162

| DRIVER IDENTIFICATION INFORMATION | TIME | DEPARTURE LOCATION | DESTINATION | REQUIRED TIME | TRAVEL ROUTE |
|---|---|---|---|---|---|
| 001 | 8 TO 9 AM ON WEEKDAYS | HOME | S | 40 MINUTES | ROUTE FROM HOME TO S |
| 001 | 17 TO 19 ON WEEKDAYS | S | HOME | 40 MINUTES | ROUTE FROM S TO HOME |
| 001 | 7 AM ON WEEKDAYS | HOME | T | 20 MINUTES | ROUTE FROM HOME TO T |

FIG. 4

SCHEDULE TABLE-LINKED PROFILE 164

| DRIVER IDENTIFICATION INFORMATION | SCHEDULE TABLE INPUT STRING | DEPARTURE LOCATION | DESTINATION | REQUIRED TIME | TRAVEL ROUTE |
|---|---|---|---|---|---|
| 001 | A SUPERMARKET | HOME | X | 30 MINUTES | ROUTE FROM HOME TO X |
| 001 | B HOSPITAL | HOME | Y | 20 MINUTES | ROUTE FROM HOME TO Y |
| 001 | C SCHOOL | HOME | Z | 20 MINUTES | ROUTE FROM HOME TO Z |

FIG. 5

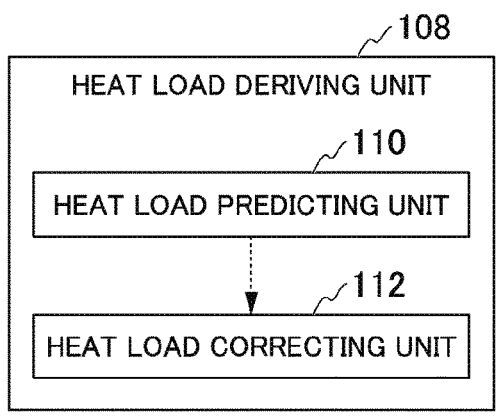

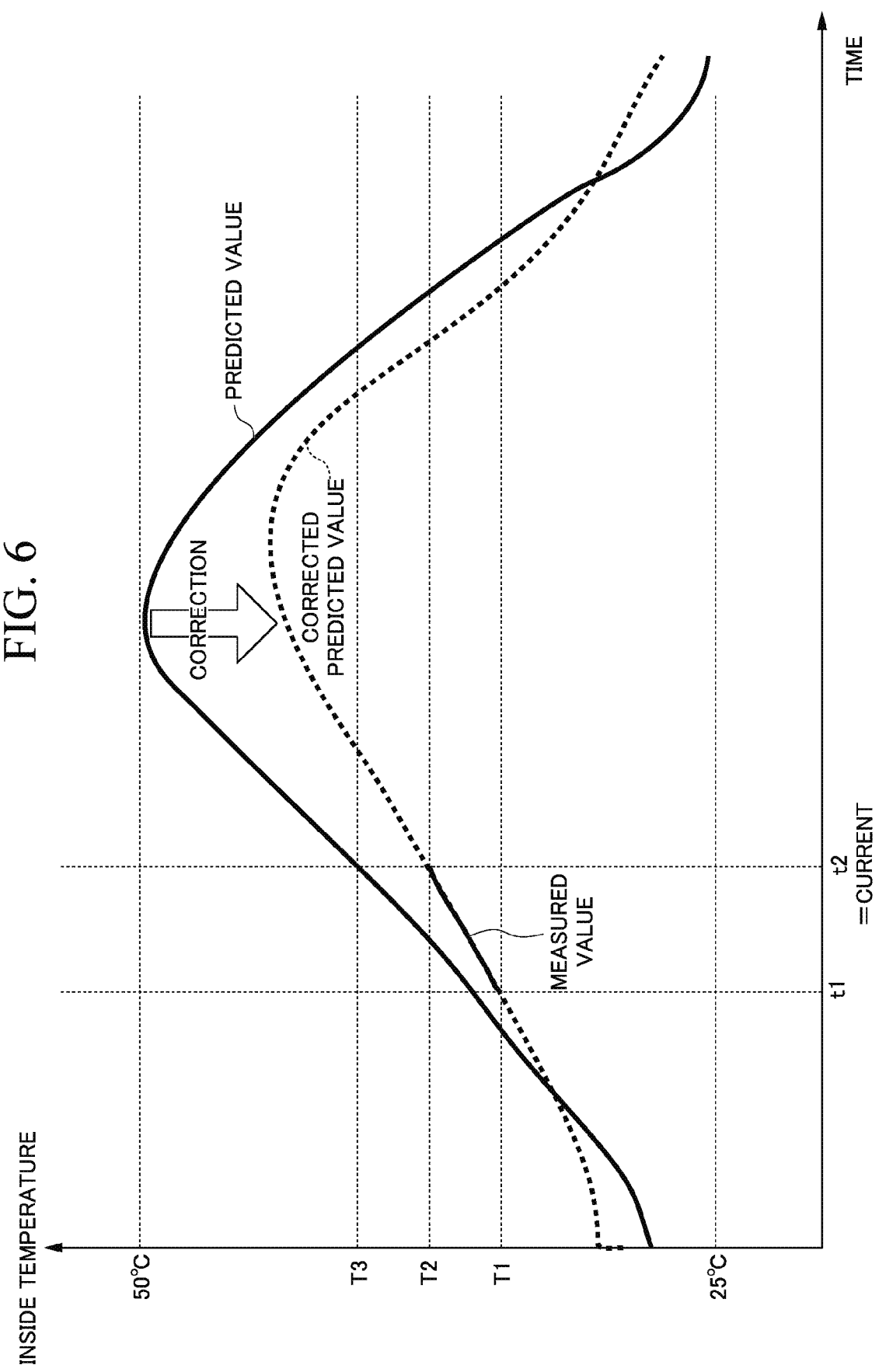

|  | OCCUPANT PROTECTION AIR CONDITIONING | HOLDING AIR CONDITIONING | PRE-AIR CONDITIONING |
|---|---|---|---|
| AIR CONDITIONING OPERATION MODE A | ○ | × | × |
| AIR CONDITIONING OPERATION MODE B | ○ | × | ○ |
| AIR CONDITIONING OPERATION MODE C | ○ | ○ | ○ |

FIG. 9

| TIME | 15:30 | 15:40 | 15:50 | 16:00 | 16:10 | 16:20 | 16:30 | 16:40 | 16:50 | 17:00 | 17:10 | 17:20 | 17:30 | AIR CONDITIONING POWER (kWh) |
|---|---|---|---|---|---|---|---|---|---|---|---|---|---|---|
| HEAT LOAD(kW) | 2 | 2.5 | 3 | 3.5 | 4 | 3.5 | 3.5 | 3 | 3 | 2 | 1.7 | 1.5 | 1.5 | |
| INSTRUCTION VALUE PATTERN A | OFF | OFF | 25 | 25 | 25 | 25 | OFF | OFF | 25 | 25 | 25 | 25 | OFF | 5 |
| INSTRUCTION VALUE PATTERN B | OFF | 25 | 25 | 25 | 25 | 25 | OFF | 25 | 25 | 25 | 25 | 25 | OFF | 4.5 |
| INSTRUCTION VALUE PATTERN C | 35 | 25 | 25 | 25 | 25 | 25 | 35 | 25 | 25 | 25 | 25 | 25 | OFF | 4 |

AIR CONDITIONING CONTROL DEVICE, AIR CONDITIONING CONTROL METHOD, AND PROGRAM

CROSS-REFERENCE TO RELATED APPLICATION

Priority is claimed on Japanese Patent Application No. 2018-199347, filed Oct. 23, 2018, the content of which is incorporated herein by reference.

BACKGROUND

Field of the Invention

The present invention relates to an air conditioning control device, an air conditioning control method, and a storage medium.

Description of Related Art

Conventionally, it is known that pre-air conditioning is activated upon receiving an instruction from a user at a remote location before the user gets on a vehicle (for example, refer to Japanese Unexamined Patent Application, First Publication No. 2006-347295).

In a case that an SOC is smaller than a total electric energy obtained by adding an electric energy for traveling to an electric energy for air conditioning, it is known that a limited air conditioning load in which an air conditioning capacity is limited such that air conditioning can be continued without being stopped to a destination is calculated on the basis of a consumable electric energy and an air conditioning request, and air conditioning control (air conditioning control after correction) is implemented on the basis of the calculated limited air conditioning load (for example, refer to Japanese Unexamined Patent Application, First Publication No. 2011-255686).

SUMMARY

However, in the technology described above, suppression of power consumption and improvement of the comfort of an occupant may not be realized at the same time in some cases.

Aspects of the present invention have been made in view of such circumstances, and have an object of providing an air conditioning control device, an air conditioning control method, and a storage medium which can suppress power consumption and improve the comfort of an occupant.

The air conditioning control device, the air conditioning control method, and the storage medium according to this invention have adopted the following configuration.

(1): According to one aspect of this invention, an air conditioning control device includes an environmental measurement information acquisition unit configured to acquire environmental measurement information obtained by measuring a current environment around a host vehicle, an action schedule estimating unit configured to acquire an action schedule of a user on the basis of past or future schedule table information of the user of the host vehicle, and to estimate a boarding time at which the user gets on the host vehicle, a destination, and a route on the basis of the acquired action schedule, an air conditioning planning unit configured to derive an instruction value pattern that includes a first instruction value for an air conditioning device of the host vehicle to match a state of the host vehicle to a target state at the boarding time, a second instruction value for the air conditioning device to match a state of the host vehicle to a target state on a travel route toward the destination, and a third instruction value for the air conditioning device to match a state of the host vehicle to a target state in a case that the user gets on after getting off the vehicle while arriving at the destination, on the basis of the environmental measurement information acquired by the environmental measurement information acquisition unit, and an air conditioning controller configured to control the air conditioning device of the host vehicle on the basis of the instruction value pattern derived by the air conditioning planning unit.

(2): In the aspect of (1) described above, the air conditioning control device further may include an environmental prediction information acquisition unit configured to acquire environmental prediction information on a travel route of the host vehicle in the future, in which the air conditioning planning unit derives an instruction value pattern on the basis of the environmental prediction information acquired by the environmental prediction information acquisition unit and the environmental measurement information acquired by the environmental measurement information acquisition unit.

(3): In the aspect of (2) described above, the environmental prediction information may include at least one of an outside temperature change forecast, a solar radiation change forecast, a humidity change forecast, a wind change forecast, a weather forecast, a pollen forecast, and a yellow sand forecast.

(4): In the aspect of (1) described above, the environmental measurement information may include at least one of an outside temperature that is a temperature outside the host vehicle, an inside temperature that is a temperature in a vehicle compartment of the host vehicle, and an amount of sunshine to the host vehicle.

(5): In the aspect of (1) described above, the air conditioning planning unit derives a plurality of instruction value patterns, and the air conditioning control device further includes a power consumption deriving unit configured to derive power consumption of the air conditioning device in a case that the air conditioning device operates according to the instruction value pattern for each of the plurality of instruction value patterns derived by the air conditioning planning unit, and an instruction value pattern selecting unit configured to select an instruction value pattern in which the power consumption derived by the power consumption deriving unit is equal to or lower than a predetermined threshold value or is minimized.

(6): In the aspect of (1) described above, the air conditioning control device may further include a threshold value setting unit configured to set the predetermined threshold value on the basis of the usable electric energy derived by the usable electric energy deriving unit, travel electric energy used by the host vehicle to travel to the destination, and stored electric energy stored in a secondary battery mounted on the host vehicle.

(7): In the aspect of (1) described above, the air conditioning control device may further include a pre-air conditioning proposal unit configured to notify the user of the host vehicle of the instruction value pattern derived by the air conditioning planning unit and to receive approval information indicating whether the user of the host vehicle approves the instruction value pattern, in which the air conditioning controller controls an air conditioning device of the host vehicle on the basis of the instruction value pattern approved according to the approval information.

(8): In the aspect of (1) described above, the air conditioning control device may further include a storage unit configured to store a travel history profile of another vehicle, in which the action schedule estimating unit estimates a boarding time at which the user gets on the host vehicle, a destination, and a route on the basis of an action history of a different user which is similar to an action history of the user stored in the storage unit or a travel history of another vehicle which is similar to a travel history of the host vehicle.

(9): According to another aspect of this invention, an air conditioning control method includes, by a computer, acquiring an action schedule of a user on the basis of past or future schedule table information of the user of a host vehicle, acquiring environmental measurement information obtained by measuring an environment around the current host vehicle, estimating a boarding time at which the user gets on the host vehicle, a destination and a route on the basis of the acquired action schedule, deriving an instruction value pattern that includes a first instruction value for an air conditioning device of the host vehicle to match a state of the host vehicle to a target state at the boarding time, a second instruction value for the air conditioning device to match a state of the host vehicle to a target state on a travel route toward the destination, and a third instruction value for the air conditioning device to match a state of the host vehicle to a target state in a case that the user gets on after getting off the vehicle while arriving at the destination on the basis of the acquired environmental measurement information, and controlling the air conditioning device of the host vehicle on the basis of the derived instruction value pattern.

(10): According to still another aspect of this invention, a (computer readable non-temporary) storage medium which stores a program causes a computer to acquire an action schedule of a user on the basis of past or future schedule table information of the user of a host vehicle, to acquire environmental measurement information obtained by measuring an environment around the current host vehicle, to estimate a boarding time at which the user gets on the host vehicle, a destination, and a route on the basis of the acquired action schedule, to derive an instruction value pattern that includes a first instruction value for an air conditioning device of the host vehicle to match a state of the host vehicle to a target state at the boarding time, a second instruction value for the air conditioning device to match a state of the host vehicle to a target state on a travel route toward the destination, and a third instruction value for the air conditioning device to match a state of the host vehicle to a target state in a case that the user gets on after getting off the vehicle while arriving at the destination on the basis of the acquired environmental measurement information and control the air conditioning device of the host vehicle on the basis of the derived instruction value pattern.

According to (1) to (10), it is possible to suppress power consumption and to improve comfort of an occupant.

BRIEF DESCRIPTION OF THE DRAWINGS

FIG. 3 is a diagram which shows an example of information stored in a regular travel profile.

FIG. 4 is a diagram which shows an example of information stored in a schedule table-linked profile.

FIG. 5 is a diagram which shows an example of a configuration of a heat load deriving unit.

FIG. 6 is a diagram which describes an example of correction processing performed by a heat load correcting unit.

FIG. 9 is a diagram which shows an example of a predicted heat load value predicted by the heat load correcting unit and an example of an instruction value pattern determined by an air conditioning planning unit.

DESCRIPTION OF EMBODIMENTS

Hereinafter, embodiments of an air conditioning control device, an air conditioning control method, and a storage medium of the present invention will be described with reference to the drawings.

First, a configuration of a vehicle 10 equipped with an air conditioning control device 100 according to an embodiment of the present invention will be described. In the following description, the vehicle 10 equipped with the air conditioning control device 100 is an electric car, but the vehicle 10 may also be a vehicle such as a hybrid vehicle equipped with a secondary battery that supplies power for traveling to a driving motor or a vehicle equipped with a fuel cell that supplies power for traveling to a driving motor.

[Vehicle]

Figure 1:
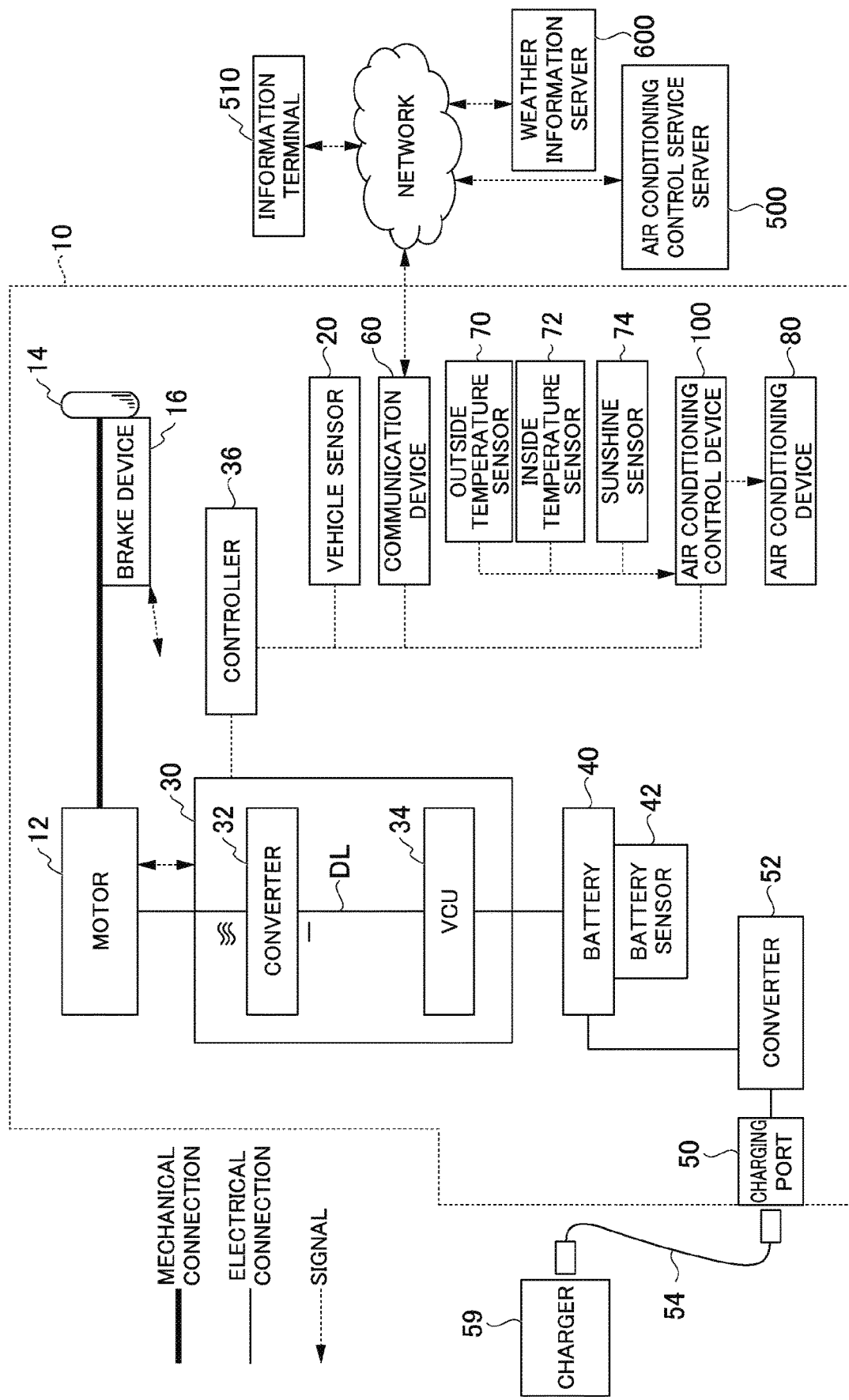
FIG. 1 is a diagram which shows an example of a configuration of a vehicle.

FIG. 1 is a diagram which shows an example of a configuration of a vehicle 10. As shown in FIG. 1, a vehicle 10 includes, for example, a motor 12, a drive wheel 14, a brake device 16, a vehicle sensor 20, a power control unit (PCU) 30, a battery (secondary battery) 40, a battery sensor 42, a charging port 50, a converter 52, a communication device 60, an outside temperature sensor 70, an inside temperature sensor 72, a sunshine sensor 74, an air conditioning device 80, and an air conditioning control device 100. These devices and apparatuses are connected to each other using a multiplex communication line such as a controller area network (CAN) communication line, a serial communication line, a wireless communication network, or the like. The configuration shown in FIG. 1 is merely an example, and some of the constituents may be omitted, and furthermore other constituents may be added thereto.

The motor 12 is, for example, a three-phase alternating current motor. A rotor of the motor 12 is coupled to the drive wheel 14. The motor 12 outputs power to the drive wheel 14 using supplied power. The motor 12 generates power using a kinetic energy of a vehicle at the time of deceleration of the vehicle.

The brake device 16 includes, for example, a brake caliper, a cylinder that transmits a hydraulic pressure to the brake caliper, and an electric motor that generates a hydraulic pressure in the cylinder. The brake device 16 may include a mechanism that transmits a hydraulic pressure generated by an operation of a brake pedal to the cylinder via a master cylinder as a backup. The brake device 16 is not limited to the configuration described above, and may also be an electrically controlled hydraulic pressure brake device that transmits a hydraulic pressure of the master cylinder to the cylinder.

The vehicle sensor 20 includes an accelerator opening sensor, a vehicle speed sensor, and a brake depression amount sensor. The accelerator opening sensor is attached to an accelerator pedal that is an example of an operator that receives an acceleration instruction from a driver, detects an operation amount of the accelerator pedal, and outputs it to the controller 36 as an accelerator opening. The vehicle speed sensor includes, for example, a speed calculator and a wheel speed sensor attached to each wheel. A speed (vehicle speed) of a vehicle is derived by integrating wheel speeds detected by the wheel speed sensor and is output to the controller 36. The brake depression amount sensor is attached to a brake pedal, detects an operation amount of the brake pedal, and outputs it to the controller 36 as a brake depression. A driver of the vehicle 10 is an example of a "user."

The PCU 30 includes, for example, a converter 32, a voltage control unit (VCU) 34, and a controller 36. It is merely an example to group these components together in the PCU 30, and these components may be configured to be disposed in a distributed manner.

The converter 32 is, for example, an AC-DC converter. A direct current side terminal of the converter 32 is connected to a direct current link DL. A battery 40 is connected to the direct current link DL via the VCU 34. The converter 32 converts an alternating current generated by the motor 12 into a direct current, and outputs it to the direct current link DL. The converter 32 may convert a direct current supplied via the direct current link DL into an alternating current and supply it to the motor 12.

The VCU 34 is, for example, a DC-DC converter. The VCU 34 boosts the power supplied from the battery 40 and outputs it to the direct current link DL.

The controller 36 includes, for example, a motor controller, a brake controller, and a battery and VCU controller. The motor controller, the brake controller, and the battery and VCU controller may be replaced by other control devices, for example, control devices such as a motor ECU, a brake ECU, and a battery ECU.

The motor controller controls the motor 12 on the basis of the operation amount of an accelerator pedal that is a result of the detection by the vehicle sensor 20. The brake controller controls the brake device 16 on the basis of the operation amount of a brake pedal that is a result of the detection by the vehicle sensor 20. The battery and VCU controller calculate a state of charge (SOC: a charge rate) of the battery 40 on the basis of an output of the battery sensor 42 attached to the battery 40.

The battery 40 is, for example, a secondary battery such as a lithium ion battery. Power introduced from a charger 59 outside the vehicle 10 is accumulated in the battery 40. The battery 40 supplies power to the motor 12. The battery sensor 42 may be, for example, a current sensor, a voltage sensor, or a temperature sensor. The voltage sensor, the current sensor, and the temperature sensor detect a current value, a voltage value, and a temperature of the battery 40, respectively. The battery sensor 42 outputs the detected current value, voltage value, temperature, and the like to the controller 36 and the communication device 60.

The charging port 50 is provided on the outer side of a vehicle body of the vehicle 10. The charging port 50 is connected to the charger 59 via a charging cable 54.

The converter 52 is provided between the battery 40 and the charging port 50. The converter 52 converts a current introduced from the charger 59 via the charging port 50, for example, an alternating current, into a direct current. The converter 52 outputs the converted direct current to the battery 40.

The communication device 60 includes a wireless module for connecting to a cellular network or a Wi-Fi network. The communication device 60 communicates with an air conditioning control service server 500, the weather information server 600, and the like via a network NW such as the Internet or using Ethernet.

The outside temperature sensor 70 is installed in, for example, an engine, a vehicle body, or a place which is not easily affected by heat of a road surface (for example, near a front bumper), detects an outside temperature, and outputs a detected value to the environmental measurement information acquisition unit 106 of the air conditioning control device 100 to be described below. The inside temperature sensor 72 is, for example, mounted inside on a bottom inner side of an instrument panel which is not shown, detects an inside temperature, and outputs a detected value to the environmental measurement information acquisition unit 106 of the air conditioning control device 100 to be described below. Each of the outside temperature sensor 70 and the inside temperature sensor 72 may be, for example, a thermistor or the like that detects a temperature change as a resistance change. The sunshine sensor 74 is installed in, for example, an instrument panel, a front windshield, or the like of the vehicle 10, detects an amount of sunshine, and outputs a detected value to the environmental measurement information acquisition unit 106 of the air conditioning control device 100 to be described below.

The air conditioning device (air conditioner) 80 adjusts an environment in a vehicle compartment by adjusting an air status in the vehicle compartment. It is assumed that an operation of the air conditioning device 80 is controlled not only by an air conditioner ECU that receives an operation of an occupant but also by an air conditioning control device 100 to be described below directly or via the air conditioner ECU. In a case that the air conditioning device 80 is controlled by the air conditioning control device 100, the air conditioning device 80 adjusts the air status in a vehicle compartment such that a temperature in the vehicle compartment of the vehicle 10 matches an instruction value given from the air conditioning control device 100. The air conditioning device 80 may include a heater, and the heater may also be provided separately from the air conditioning device 80.

The vehicle 10 further includes a navigation device and the like not shown in addition to the configuration described above. The navigation device includes, for example, a global navigation satellite system (GNSS) receiver, a navigation HMI, and a route determination unit, and holds map information in a storage device such as a hard disk drive (HDD) or a flash memory. The GNSS receiver identifies a position of the host vehicle M on the basis of a signal received from GNSS satellites. The navigation HMI includes a display device, a speaker, a touch panel, a key, and the like. The route determination unit, for example, determines a route (hereinafter, a route on a map) from the position of the host vehicle M identified by the GNSS receiver (or any input position) to a destination input by a user such as the driver using the navigation HMI with reference to first map information. Map information is, for example, information in which a road shape is represented by a link indicating a road and nodes connected by a link. The navigation device may be realized by, for example, a function of a terminal device such as a smartphone or tablet terminal owned by a user such as a driver.

[Configuration of Air Conditioning Control Device 100]

Hereinafter, a function of each part of the air conditioning control device 100 will be described.

Figure 2:
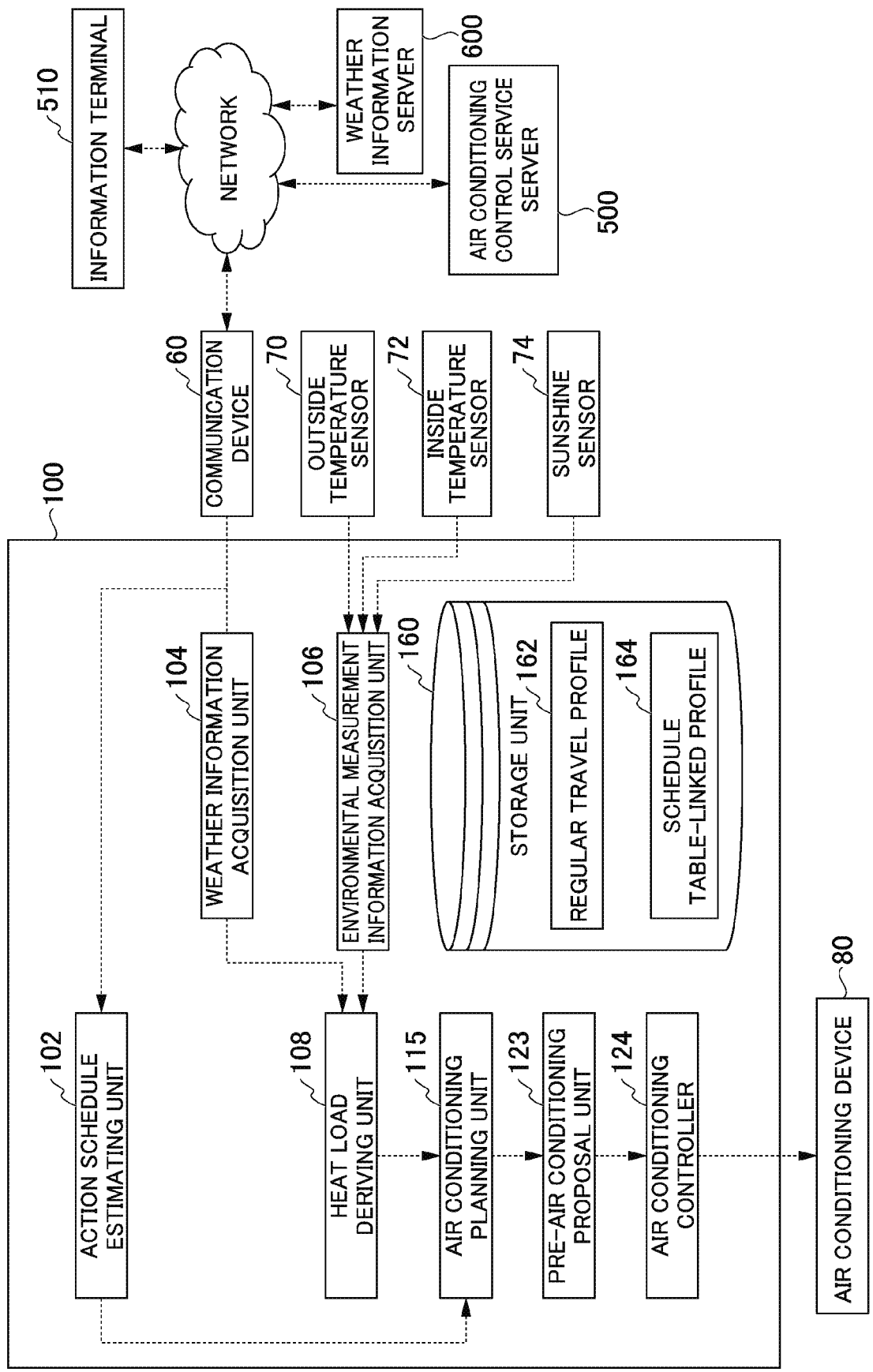
FIG. 2 is a diagram which shows an example of a configuration of an air conditioning control device.

FIG. 2 is a diagram which shows an example of a functional configuration of the air conditioning control device 100. The air conditioning control device 100 includes, for example, an action schedule estimating unit 102, a weather information acquisition unit 104, an environmental measurement information acquisition unit 106, a heat load deriving unit 108, an air conditioning planning unit 115, a pre-air conditioning proposal unit 123, an air conditioning controller 124, and a storage unit 160. Components of the air conditioning control device 100 are realized by, for example, a hardware processor such as a central processing unit (CPU) executing a program (software). Some or all of these components may be realized by using hardware (a circuit unit; including circuitry) such as a large-scale integration (LSI), an application specific integrated circuit (ASIC), a field-programmable gate array (FPGA), and a graphics processing unit (GPU), or may be realized by a cooperation of software and hardware. The program may be stored in a storage device (storage device including a non-transitory storage medium) such as a hard disk drive (HDD) or a flash memory in advance, or may be stored in a detachable storage medium (non-transitory storage medium) such as a DVD or a CD-ROM, and may also be installed by a storage medium being attached to a drive device.

All or some of functions of the air conditioning control device 100 may be realized by an information terminal 510 used by a driver and to be described below. All or some of the functions of the air conditioning control device 100 may be realized by being distributed by the information terminal 510, the air conditioning control service server 500 communicated via the communication device 60, or the like. In this case, a combination of a part of the air conditioning control device 100, a part of the information terminal 510, and a part of the air conditioning control service server 500 is an example of an "air conditioning control device."

The action schedule estimating unit 102 estimates an action including a departure location, a boarding time, a travel route, a desired arrival time, a destination, a staying time, and the like of the driver of the vehicle 10 on the basis of a schedule registered in advance in the schedule table by the driver. An "event," "place," "start time," "end time," and the like are registered in the schedule registered in the schedule table. For example, the action schedule estimating unit 102 may access the air conditioning control service server 500 via the network NW, acquires an action schedule of the schedule table registered by the driver using the information terminal 510 in advance, and estimates an action of the driver of the vehicle 10 on the basis of the acquired information. In a case that the travel route, the destination, or the like is input to a navigation device not shown, the action schedule estimating unit 102 estimates a departure location, a boarding time, a travel route, a desired arrival time, a destination, a staying time, and the like of the driver of the vehicle 10 in consideration of input details.

The schedule table may also be stored in the storage unit of the vehicle 10. In this case, a driver operates an operation unit of a car navigation device (not shown) or an operation unit provided in the instrument panel to input a schedule. Then, the input schedule is stored in association with the schedule table.

The action schedule estimating unit 102 may estimate the action of a driver by referring to, for example, a regular travel profile 162 and a schedule table-linked profile 164 stored in the storage unit 160 (that is, referring to the past action history of the driver). Then, the action schedule estimating unit 102 estimates the departure location, the boarding time, the travel route, the desired arrival time, the destination, and the staying time of the driver of the vehicle 10 on the basis of the acquired action schedule of the schedule table and the referred to regular travel profile 162 and schedule table-linked profile 164.

FIG. 3 is a diagram which shows an example of information stored in the regular travel profile 162. For example, the regular travel profile 162 is information in which a travel route on which the driver of the vehicle 10 regularly travels, identification information of the driver, a time zone in which there are a lot of travel on the travel route, a departure location, a destination, and a required time for traveling on the travel route are recorded in association with one another based on travel results of the vehicle 10.

FIG. 4 is a diagram which shows an example of information stored in the schedule table-linked profile 164. For example, the schedule table-linked profile 164 is information in which a route on which the driver of the vehicle 10 travels irregularly, a schedule table input string that the driver tends to input to the schedule table at the time of traveling on a route, a departure location, a destination, and required time for traveling the route are recorded in association with one another. The regular travel profile 162 and the schedule table-linked profile 164 are generated in advance by an external profile generation device 200. The details of the profile generation device 200 will be described below.

The action schedule estimating unit 102 can estimate a travel route, a departure location, a destination, and required time in the future by collating information of the action schedule of the schedule table acquired from the air conditioning control service server 500 with information of the schedule table-linked profile 164. For example, in a case that a "B hospital" is included in the action schedule of the schedule table acquired from the air conditioning control service server 500, it is possible to acquire a travel route and required time at the time of traveling toward the destination of the "B hospital" in the same manner as in the past by referring to the schedule table-linked profile 164. The action schedule estimating unit 102 can estimate and acquire a boarding time at which the driver gets on the vehicle 10 by subtracting the required time from the start time of the action schedule of the schedule table acquired from the air conditioning control service server 500. For example, the schedule table-linked profile 164 may include a fact that there is a tendency to stop at an "X convenience store" as a transit point on the way to the destination of the "B hospital," and information on an average stopping time there and the like. The schedule table-linked profile 164 may include information on a plurality of transit points.

For example, in a case that there is no schedule in the near future at the present in the action schedule of the schedule table acquired from the air conditioning control service server 500, the action schedule estimating unit 102 can estimate the departure location, the boarding time, the travel route, the desired arrival time, the destination, and the staying time of the driver of the vehicle 10 by referring to a current date and time and the regular travel profile 162.

The action schedule estimating unit 102 estimates the departure location, the boarding time, the travel route, the desired arrival time, the destination, and the staying time of the driver of the vehicle 10 using, for example, an algorithm generated on the basis of statistical processing such as machine learning or regression analysis. The algorithm is an algorithm that, in a case that identification information of a user, a date, a day of the week, and the like are input, predicts an action of the user on a date or a day of the week. The schedule table-linked profile 164 and the regular travel profile 162 may include, for example, a frequency of travel and the like, and the action schedule estimating unit 102 may estimate the departure location, the boarding time, the travel route, the desired arrival time, the destination, and the staying time of the driver of the vehicle 10 in consideration of weighting based on the frequency of travel of a combination of the departure location and the destination. Information such as the departure location, the travel route, the destination, and the like can be represented by a set of unique numbers that indicate links and nodes representing a road used in map information stored in the map information storage unit 64, coordinates of latitude and longitude, and the like.

The action schedule estimating unit 102 outputs the estimated departure location, boarding time, travel route, desired arrival time, destination, and staying time of the driver of the vehicle 10 to the air conditioning planning unit 115.

The weather information acquisition unit 104 accesses, for example, the weather information server 600 via the network NW to acquire weather information. The weather information acquisition unit 104 is an example of the environmental prediction information acquisition unit. Weather information includes, for example, an outside temperature change forecast, a solar radiation change forecast, a humidity change forecast, a wind change forecast, a weather forecast, a pollen forecast, a yellow sand forecast, and the like. The wind change forecast includes, for example, a forecast of a wind speed or a wind direction. The weather information server 600 is, for example, a server provided by a weather information provider who provides a weather forecast, and the weather information acquisition unit 104 can acquire, for example, weather information from the weather information server 600 by using a predetermined application programming interface (API). The air conditioning control service server 500 acquires weather information by accessing the weather information server 600 in advance, and stores the acquired weather information in the air conditioning control service server 500, and thereby the weather information acquisition unit 104 may acquire the weather information from the air conditioning control service server 500. The weather information acquisition unit 104 may acquire weather information on a travel route of a travel schedule from an oncoming car or a car traveling in the vicinity by inter-vehicle communication.

The environmental measurement information acquisition unit 106 acquires a detected value of the outside temperature detected by the outside temperature sensor 70, a detected value of the inside temperature detected by the inside temperature sensor 72, and a detected value of the amount of sunshine detected by the sunshine sensor 74, respectively, and outputs them to the heat load deriving unit 108.

FIG. 5 is a diagram which shows an example of the configuration of the heat load deriving unit 108. The heat load deriving unit 108 includes a heat load predicting unit 110 and a heat load correcting unit 112. The heat load predicting unit 110 acquires a departure location, a boarding time, a travel route, a desired arrival time, a destination, and a staying time of the driver of the vehicle 10 from, for example, the action schedule estimating unit 102, acquires weather information from the weather information acquisition unit 104, and acquires vehicle information of the vehicle 10 from the storage unit 160 or the controller 36. The vehicle information of the vehicle 10 includes, for example, a glass area, a glass type, a cabin volume, an interior material volume, and the like of the vehicle 10. The heat load predicting unit 110 calculates a heat load to be received by the vehicle 10 on the basis of a temperature and solar radiation that are predicted in a travel route of a travel schedule of the vehicle 10, and vehicle information of the vehicle 10. The heat load predicting unit 110 predicts the heat load of the vehicle 10 from a driver's getting on the vehicle 10 at a boarding time to arrival at a destination by traveling along the travel route on the basis of the acquired information, and outputs a predicted heat load to the heat load correcting unit 112. Furthermore, the heat load predicting unit 110 may acquire, for example, a direction or position of the vehicle 10 from a navigation device not shown or the vehicle sensor 20. In this case, for example, it is possible to improve accuracy in prediction of the heat load received by the vehicle 10 by considering the direction or position of the vehicle 10 and a direction of the solar radiation.

The heat load correcting unit 112 acquires the heat load predicted by the heat load predicting unit 110 and performs correction thereon. Since the heat load predicted by the heat load predicting unit 110 is predicted on the basis of weather information provided by a weather information provider, it is preferable that the heat load be corrected. Correction of the heat load by the heat load correcting unit 112 is performed in a case that the vehicle 10 is parked and an air conditioning operation of the air conditioning device 80 is stopped. Correction using the heat load correcting unit 112 may not necessarily be performed. In this case, the heat load predicted by the heat load predicting unit 110 is output to the air conditioning planning unit 115 as a predicted heat load value without being corrected. The heat load correcting unit 112 estimates the presence or absence of a roof at a place where the vehicle 10 is parked on the basis of positional information acquired by the navigation device or the amount of sunshine output by the sunshine sensor 74, and performs correction which reduces the heat load in a case that there is a roof.

FIG. 6 is a diagram which describes an example of correction processing performed by the heat load correcting unit 112. The heat load correcting unit 112, for example, corrects a predicted inside temperature value calculated from the heat load predicted by the heat load predicting unit 110 on the basis of the detected value of the inside temperature which is a measured value acquired by the environmental measurement information acquisition unit 106. The heat load correcting unit 112 detects a difference between the predicted inside temperature (the predicted inside temperature value) of the vehicle 10 and the detected value of the inside temperature (the detected inside temperature value) acquired by the environmental measurement information acquisition unit 106 in a predetermined period. In FIG. 6, for example, t2 is a current time, and the heat load correcting unit 112 detects a temperature difference between the predicted inside temperature value and the detected inside temperature value in a period (predetermined period) from t1 in the past to the current time t2. The heat load correcting unit 112 corrects the predicted inside temperature value in the future after the current time t2 on the basis of the detected temperature difference. The heat load correcting unit 112 predicts a heat load on the vehicle 10 which approximates to a real environment of the vehicle 10 by correcting the heat load predicted by the heat load predicting unit 110 on the basis of the corrected predicted inside temperature value. In the above description, for the sake of description, the heat load correcting unit 112 has performed correction using the detected value of an inside temperature acquired by the environmental measurement information acquisition unit 106, but the heat load correcting unit 112 may correct the predicted inside temperature value using, for example, a detected value of an outside temperature, a detected value of the amount of sunshine, an orientation of the vehicle 10, and a solar radiation direction acquired by the environmental measurement information acquisition unit 106. The heat load correcting unit 112 can also perform correction by combining a plurality of these elements.

Figures 7, 8:
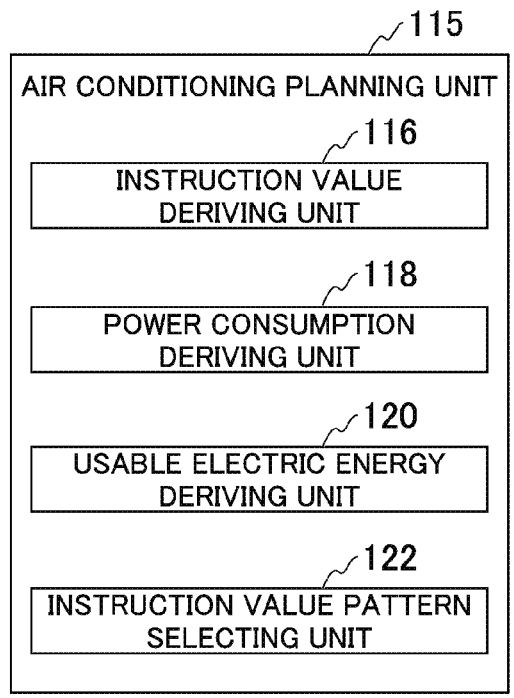
FIG. 7 is a diagram which shows an example of a configuration of an air conditioning planning unit.
FIG. 8 is a diagram which shows an example of an air conditioning operation mode.

FIG. 7 is a diagram which shows an example of a configuration of the air conditioning planning unit 115. The air conditioning planning unit 115 includes an instruction value deriving unit 116, a power consumption deriving unit 118, a usable electric energy deriving unit 120, and an instruction value pattern selecting unit 122.

FIG. 8 is a diagram which shows an example of an air conditioning operation mode. The air conditioning device 80 can be operated, for example, in accordance with an air conditioning operation mode A, an air conditioning operation mode B, and an air conditioning operation mode C. In the air conditioning operation mode A, only occupant protection air conditioning is performed, and holding air conditioning and pre-air conditioning are not performed. In the air conditioning operation mode B, the occupant protection air conditioning and the pre-air conditioning are performed, but the holding air conditioning is not performed. In the air conditioning operation mode C, all of the occupant protection air conditioning, the holding air conditioning, and the pre-air conditioning are performed. The pre-air conditioning is, for example, an air conditioning operation mode in which the air conditioning device 80 is caused to perform an air conditioning operation in advance and a temperature in the vehicle compartment of the vehicle 10 is made to match an instruction value before the user gets on the vehicle. The holding air condition is, for example, an air conditioning operation mode in which, in a case that the temperature in the vehicle compartment of the vehicle 10 reaches a predetermined temperature (for example, 35° C.) after the driver gets off the vehicle, the air conditioning device 80 is caused to perform an air conditioning operation in advance and the temperature in the vehicle compartment of the vehicle 10 is kept at a predetermined temperature to avoid a rapid air conditioning operation and to perform an air conditioning operation efficiently. The occupant protection air conditioning is, for example, an air conditioning operation mode for securing safety of an occupant by preventing the temperature in the vehicle compartment of the vehicle 10 from excessively rising. The air conditioning operation mode A, the air conditioning operation mode B, and the air conditioning operation mode C are examples of an air conditioning operation mode, and the present invention is not limited thereto. For example an air conditioning operation mode for minimizing noise of an air conditioning operation in a residential area or the like, and various operation modes may be considered.

The instruction value deriving unit 116, for example, derives an instruction value pattern A, an instruction value pattern B, and an instruction value pattern C shown in third to fifth lines of FIG. 9 to be described below according to each of the air conditioning operation mode A, the air conditioning operation mode B, and the air conditioning operation mode C on the basis of heat load prediction acquired by the heat load deriving unit 108. Each of the instruction value pattern A, the instruction value pattern B, and the instruction value pattern C includes an instruction value for the air conditioning device 80 to match the temperature in the vehicle compartment of the vehicle 10 and a target temperature at each time. For example, the instruction value included in each instruction value pattern is a temperature (° C.). The instruction value may include a value (OFF) to stop the air conditioning device 80 in addition to the temperature (° C.).

FIG. 9 is a diagram which shows an example of a predicted heat load value predicted by the heat load correcting unit 112 and an example of an instruction value pattern determined by the air conditioning planning unit 115. The heat load correcting unit 112 outputs a heat load obtained by correcting the heat load predicted by the heat load predicting unit 110 to the air conditioning planning unit 115 as a predicted heat load value for each time from a driver's getting on the vehicle 10 at a boarding time to arrival at the destination by traveling along a travel route. An example of the predicted heat load value output by the heat load correcting unit 112 is a value of a "heat load (kW) line shown in a second line from the top of a table shown in FIG. 9.

In the example of FIG. 9, it is assumed that the action schedule estimating unit 102 performs prediction as follows. The vehicle 10 is parked at a time 15:30. The driver gets on the vehicle 10 and starts traveling at a time 15:50. The driver parks and gets off the vehicle 10 at a time 16:30. The driver gets on the vehicle 10 again and starts traveling at a time 16:50. The driver parks and gets off the vehicle 10 at a time 17:30. In this case, the heat load deriving unit 108 derives heat load prediction indicated in a "heat load (kW)" line. A part or all of instruction values of the instruction value pattern A to the instruction value pattern C at the time 15:30 and a time 15:40 in FIG. 9 are examples of a "first instruction value." A part or all of instruction values of the instruction value pattern A to the instruction value pattern C at the time 15:50 to a time 16:20 in FIG. 9 are examples of a "second instruction value." Instruction values of the instruction value pattern A to the instruction value pattern C at the time 16:30 and a time 16:40 in FIG. 9 are examples of a "third instruction value."

The power consumption deriving unit 118 derives power consumption in a case that the air conditioning device 80 performs an air conditioning operation in accordance with each of the instruction value pattern A, the instruction value pattern B, and the instruction value pattern C (an example of the power consumption is shown at the rightmost column of FIG. 9).

The usable electric energy deriving unit 120 acquires a state of charge (SOC: charging rate) of the battery 40 calculated by the battery and VCU controller of the controller 36 and acquires the departure location, the boarding time, the travel route, the desired arrival time, the destination, the staying time, and the like of the driver of the vehicle 10 from the action schedule estimating unit 102. The power consumption deriving unit 118, based on the acquired information, predicts an amount of power consumption (Wh) used for traveling from the driver's getting on the vehicle 10 at a boarding time to arrival at the destination by traveling along the travel route, and derives electric energy according to an SOC obtained by subtracting an index associated with the predicted amount of power consumption from the SOC of the battery 40 as usable electric energy (Wh).

Figure 10:
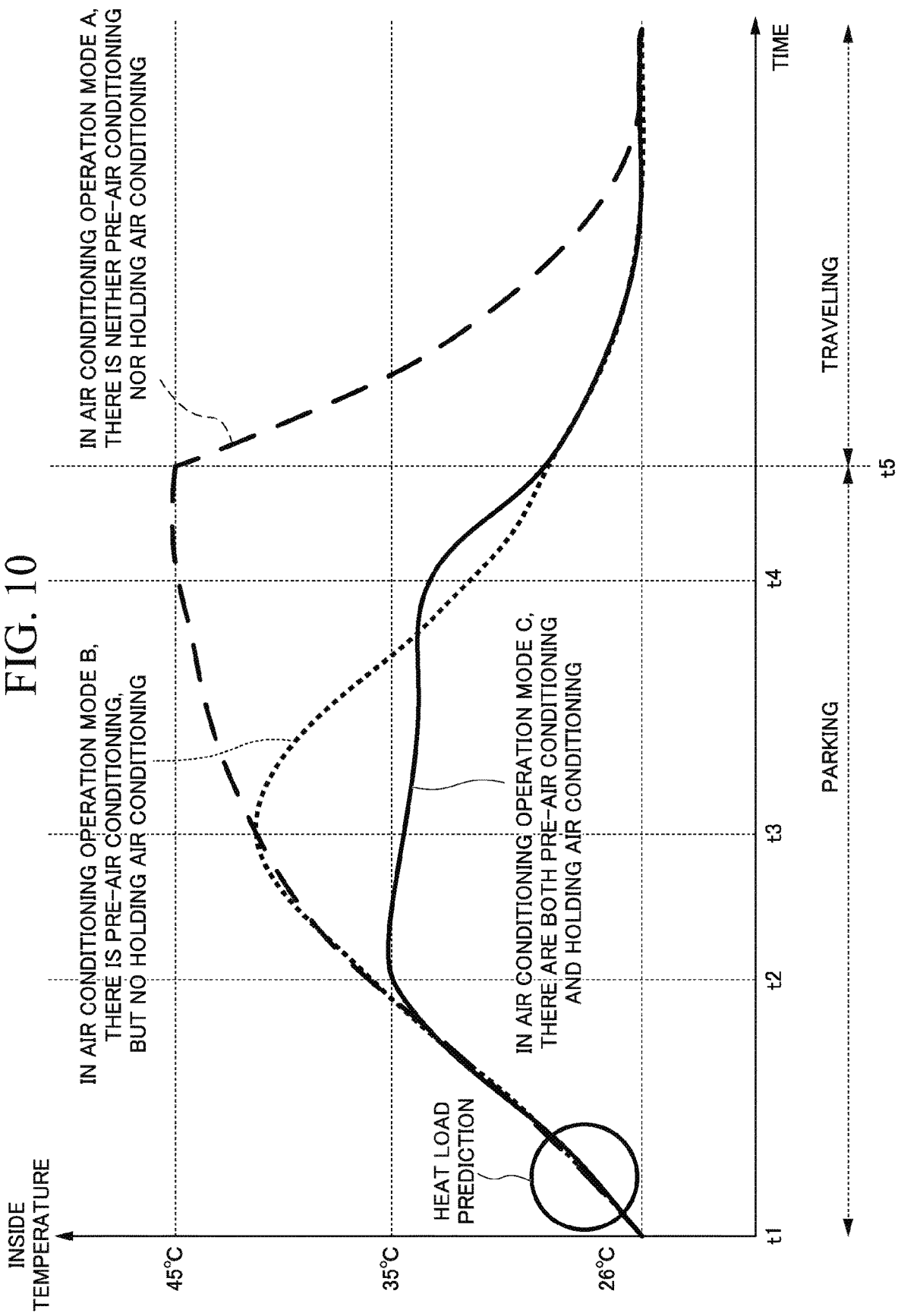
FIG. 10 is a diagram which shows an example of an air conditioning operation of an air conditioning device in accordance with an instruction value pattern generated by an instruction value deriving unit.

FIG. 10 is a diagram which shows an example of the air conditioning operation of the air conditioning device 80 in accordance with an instruction value pattern A, an instruction value pattern B, and an instruction value pattern C, which are generated by the instruction value deriving unit 116 of the air conditioning planning unit 115. In the example of FIG. 10, it is assumed that the vehicle 10 is parked at time t1. The driver parks the vehicle 10 at time t1 and turns off an ignition power supply (IG). The temperature in the vehicle compartment of the vehicle 10 starts to rise due to the outside temperature of the vehicle 10 and the solar radiation after time t1. In the air conditioning operation mode A, neither the pre-air conditioning nor the holding air conditioning is performed, but an occupant protection air conditioning operation is performed. The air conditioning device 80 performs an air conditioning operation by performing the occupant protection air conditioning operation, and the temperature in the vehicle compartment of the vehicle 10 is kept at about 40[° C.]. The driver gets on the vehicle 10 again and turns on the IG at time t5. The air conditioning device 80 rapidly performs an air conditioning operation, and the temperature in the vehicle compartment of the vehicle 10 falls.

In the air conditioning operation mode B, the pre-air conditioning is performed, but the holding air conditioning is not performed. After time t1, the temperature in the vehicle compartment of the vehicle 10 starts to rise due to the outside temperature of the vehicle 10 and solar radiation. At time t3, the air conditioning device 80 performs an air conditioning operation according to the pre-air conditioning and the temperature in the vehicle compartment of the vehicle 10 falls.

In the air conditioning operation mode C, both of the pre-air conditioning and the holding air conditioning are performed. For this reason, the temperature in the vehicle compartment of the vehicle 10 starts to rise due to the outside temperature of the vehicle 10 and solar radiation after time t1. If the temperature in the vehicle compartment of the vehicle 10 reaches a predetermined temperature (for example, 35[° C.]), the air conditioning device 80 performs the holding air conditioning such that the temperature in the vehicle compartment of the vehicle 10 is kept at the predetermined temperature. The air conditioning device 80 performs the pre-air conditioning, and, as a result thereof, the temperature in the vehicle compartment of the vehicle 10 starts to fall from around time t4.

Figure 11:
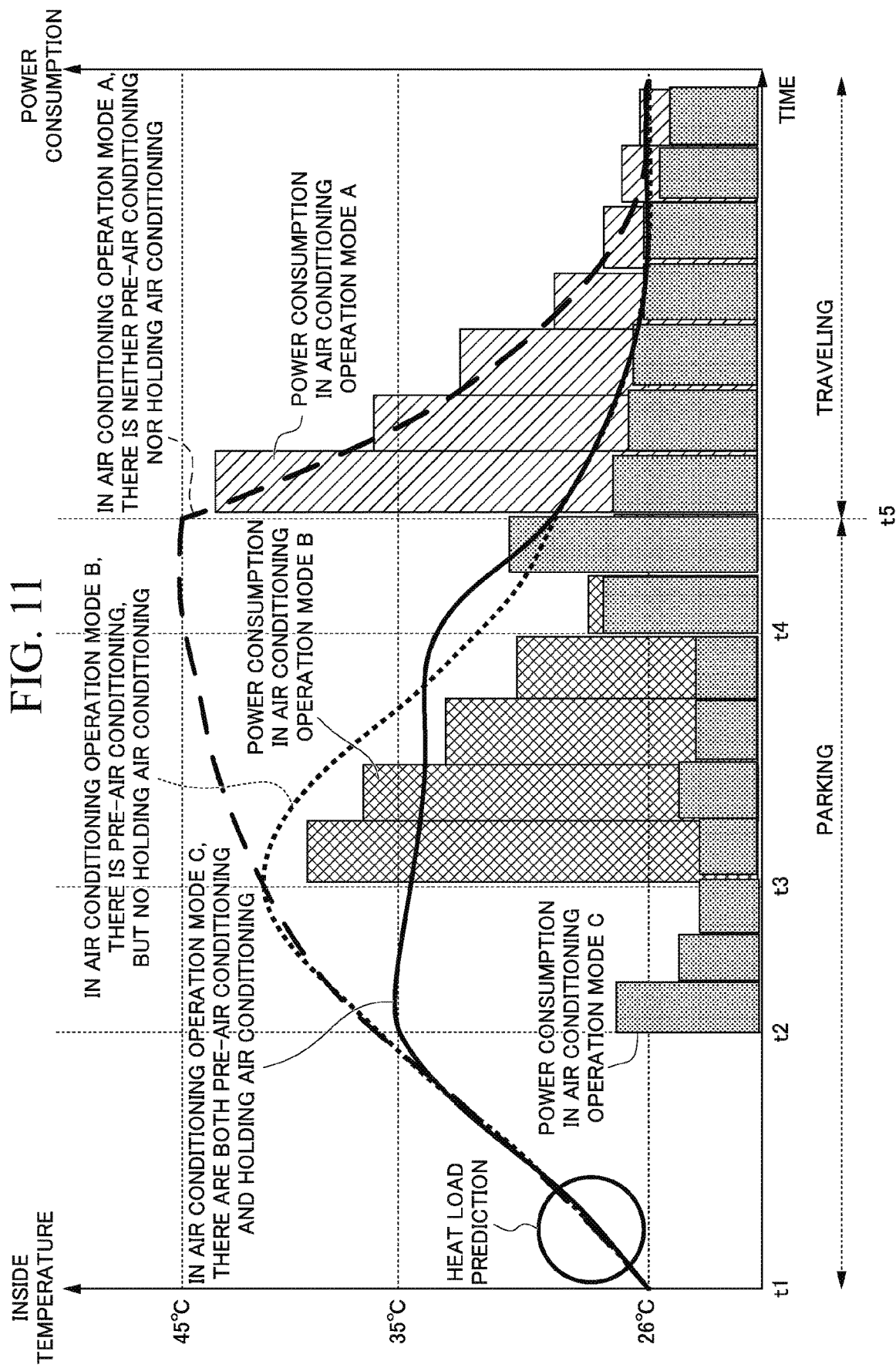
FIG. 11 is a diagram which describes an example of power consumption of the air conditioning operation of an air conditioning device in accordance with an instruction value pattern generated by an instruction value deriving unit.

FIG. 11 is a diagram which describes an example of power consumption of the air conditioning operation of the air conditioning device 80 in accordance with the instruction value pattern A, the instruction value pattern B, and the instruction value pattern C, which are generated by the instruction value deriving unit 116 of the air conditioning planning unit 115. Hereinafter, differences among the air conditioning operation mode A, the air conditioning operation mode B, and the air conditioning operation mode C will be described. The air conditioning device 80 consumes an extremely large power consumption to rapidly perform an air conditioning operation after time t5 at which the driver gets on the vehicle 10 again and turns on the IG in the air conditioning operation mode A. The air conditioning device 80 consumes large power consumption at the time of performing an air conditioning operation according to the pre-air conditioning after time t3 in the air conditioning operation mode B. In the air conditioning operation mode B, power consumption of the air conditioning device 80 at the time of performing the pre-air conditioning is smaller than the power consumption of the air conditioning device 80 immediately after the driver gets on the vehicle 10 in the air conditioning operation mode A. The air conditioning device 80 consumes power consumption in a case that an air conditioning operation is performed according to the holding air conditioning after time t2 in the air conditioning operation mode C. The power consumption of the air conditioning device 80 according to the holding air conditioning in the air conditioning operation mode C is smaller than the power consumption of the air conditioning device 80 immediately after the driver gets on the vehicle in the air conditioning operation mode A or the air conditioning operation mode B.

The instruction value deriving unit 116 of the air conditioning planning unit 115 may adopt a combination of a plurality of different air conditioning operation modes in one instruction value pattern.

In FIGS. 10 and 11, as described above, a change in the inside temperature at a timing at which the vehicle 10 is parked and the driver gets on the vehicle 10 (a time t1 to a time t5) is indicated. Accordingly, times t5 in FIGS. 10 and 11 correspond to, for example, around a time 15:50 and around a time 16:50 in the heat load and the instruction value pattern of FIG. 9.

The instruction value pattern selecting unit 122 selects an instruction value pattern among the instruction value pattern A to the instruction value pattern C in consideration of the comfort in a case that an occupant gets on the vehicle and the amount of power consumption on the basis of the departure location, the boarding time, the travel route, the desired arrival time, the destination, the staying time of the driver of the vehicle 10, and the heat load prediction predicted by the heat load predicting unit 110 of the heat load deriving unit 108. The instruction value pattern selecting unit 122 may select an instruction value pattern in which power consumption is smaller than a usable electric energy derived by the usable electric energy deriving unit 120. The instruction value pattern selecting unit 122 may select an instruction value pattern in which power consumption derived by the power consumption deriving unit 118 is minimized. The instruction value pattern selecting unit 122 may select an instruction value pattern in which the power consumption derived by the power consumption deriving unit 118 is equal to or lower than a predetermined threshold value. The predetermined threshold value may be the usable electric energy derived by the usable electric energy deriving unit 120. The instruction value pattern selecting unit 122 may select an instruction value pattern in which the inside temperature in a case that the driver gets on the vehicle 10 is equal to or lower than a predetermined value. The instruction value pattern selecting unit 122 may select an instruction value pattern in which the inside temperature in a case that the driver gets on the vehicle 10 is equal to or lower than a predetermined value and the power consumption derived by the power consumption deriving unit 118 is minimized. The instruction value pattern selecting unit 122 outputs the selected instruction value pattern to the pre-air conditioning proposal unit 123.

In a case that any power consumption derived by the power consumption deriving unit 118 is not equal to or lower than the predetermined threshold value (for example, the usable electric energy derived by the usable electric energy deriving unit 120), the instruction value pattern selecting unit 122 selects an instruction value pattern in which the power consumption derived by the power consumption deriving unit 118 is minimized. Furthermore, the instruction value pattern selecting unit 122 may instruct the controller 36 to decrease power supplied to the motor 12 (reduce speed of the vehicle 10) and to reduce power consumption for traveling. Alternatively, in a case that any power consumption derived by the power consumption deriving unit 118 is not equal to or lower than the predetermined threshold value (for example, the usable electric energy derived by the usable electric energy deriving unit 120), the instruction value pattern selecting unit 122 may notify the driver of the vehicle 10 via the navigation device or the information terminal 510 that "since the stored electric energy of the battery 40 is insufficient for comfortable air conditioning, it is proposed to reduce an air conditioning operation, to change the destination to a nearby place, or to perform charging of the battery 40 of the vehicle 10 at a charging spot in the middle of a route to the destination." In this case, the pre-air conditioning proposal unit 123 causes the navigation device or the information terminal 510 to display charging spots nearby. In the case of charging at a charging spot, the air conditioning planning unit 115 calculates an instruction value pattern again. As a result, the pre-air conditioning proposal unit 123 can propose content of a proposed-type pre-air conditioning under condition after charging again.

The pre-air conditioning proposal unit 123 receives an instruction value pattern from the instruction value pattern selecting unit 122 and sends a notification to the information terminal 510 via the air conditioning control service server 500, thereby confirming to the driver whether to implement the pre-air conditioning or the holding air conditioning. The driver inputs an operation regarding whether to implement the pre-air conditioning or the holding air conditioning by operating the information terminal 510. The pre-air conditioning proposal unit 123 receives an operation from the driver via the air conditioning control service server 500 and outputs an instruction to the air conditioning controller 124.

Figure 12:
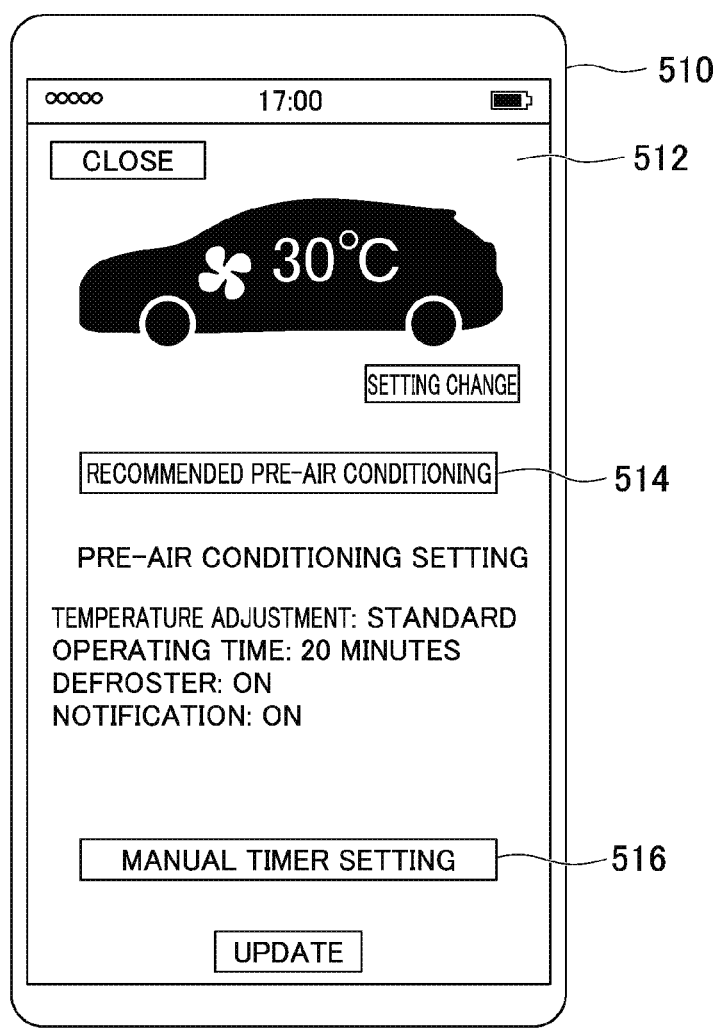
FIG. 12 is an example of an air conditioning proposal function selection screen to be displayed on an information terminal by a pre-air conditioning proposal unit.

Next, a screen which is displayed on the information terminal 510 by the pre-air conditioning proposal unit 123 will be described. FIG. 12 is an example of air conditioning proposal function selection screen to be displayed on the information terminal 510 by the pre-air conditioning proposal unit 123.

The information terminal 510 is, for example, a smartphone, a tablet, a laptop computer, a game console, or the like. A display screen 512 is, for example, various displays such as a liquid crystal display device, and displays various types of information by communicating with the air conditioning control service server 500. The information terminal 510 includes, for example, input devices such as a switch, a touch panel, a keyboard, and a voice input device, and outputs signals in accordance with various input operations by the driver. The information terminal 510 accesses the air conditioning control service server 500 by a browser or application program being started, receives an input of the driver while displaying a predetermined screen, and sends content of the input to the air conditioning control service server 500. The pre-air conditioning proposal unit 123 receives the content of an input of the driver from the information terminal 510 via the air conditioning control service server 500.

The driver presses a remote air conditioning start button not shown, and thereby the air conditioning proposal function selection screen shown in FIG. 12 is displayed. The air conditioning proposal function selection screen includes a proposed-type pre-air conditioning execution button 514 (recommended pre-air conditioning) and a manual air conditioning ON button 516 (manual air conditioning ON). The proposed-type pre-air conditioning execution button 514 (recommended pre-air conditioning) is pressed on the air conditioning proposal function selection screen, and thereby the pre-air conditioning proposal unit 123 is caused to execute the proposed-type pre-air conditioning.

Figure 13:
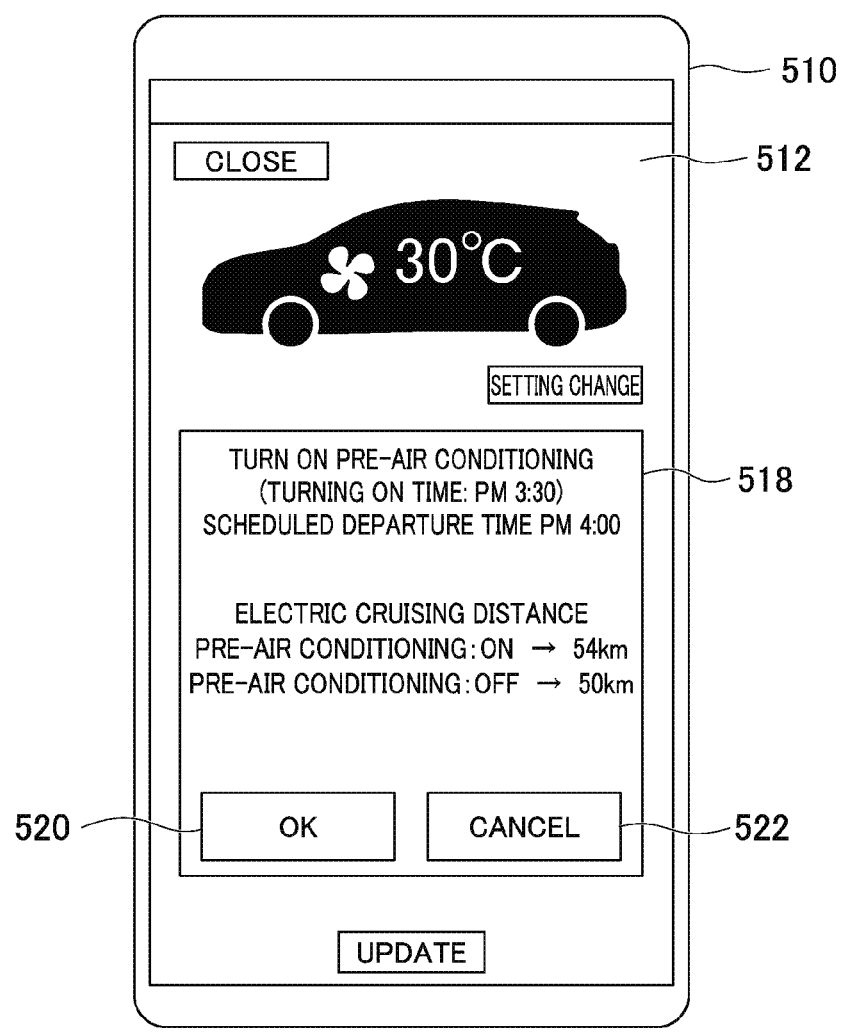
FIG. 13 is an example of a pre-air conditioning confirmation screen to be displayed on the information terminal by the pre-air conditioning proposal unit.

FIG. 13 is an example of a pre-air conditioning confirmation screen to be displayed on the information terminal 510 by the pre-air conditioning proposal unit 123. If the driver presses the proposed-type pre-air conditioning execution button 514 (recommended pre-air conditioning) on the air conditioning proposal function selection screen, for example, a pre-air conditioning confirmation screen shown in FIG. 13 is displayed. The pre-air conditioning confirmation screen includes a proposed-type pre-air conditioning display 518, an OK button 520, and a cancel button 522. Content of the proposed-type pre-air conditioning proposed by the pre-air conditioning proposal unit 123 is displayed on the proposed-type pre-air conditioning display 518. On the pre-air conditioning confirmation screen shown in FIG. 13, for example, it is displayed that pre-air conditioning starts at 3:30 PM, 4 PM estimated by the action schedule estimating unit 102 is displayed as a scheduled departure time, and an electric cruising distance which is reduced by power consumption of this pre-air conditioning is displayed. The driver views the proposed-type pre-air conditioning display 518 proposed by the pre-air conditioning proposal unit 123 and presses the approval button 520 in a case that the proposed proposed-type pre-air conditioning is executed. If information indicating that the driver has pressed the approval button 520 is received by the pre-air conditioning proposal unit 123 via the air conditioning control service server 500, the pre-air conditioning proposal unit 123 outputs an instruction value pattern in accordance with the proposed-type pre-air conditioning display 518 to the air conditioning controller 124, thereby causing the air conditioning controller 124 to execute air conditioning control.

The air conditioning controller 124 controls the air conditioning device 80 according to an instruction value pattern acquired by the pre-air conditioning proposal unit 123. The air conditioning controller 124, for example, instructs the air conditioning device 80 to indicate an instruction value pattern included in the instruction value pattern in accordance with the air conditioning operation mode A in a case that an operation instruction that the pre-air conditioning proposal unit 123 receives from the information terminal 510 via the air conditioning control service server 500 is an occupant protection air conditioning operation. For example, in a case that the instruction is the proposed-type pre-air conditioning, the air conditioning controller 124 instructs the air conditioning device 80 to indicate an instruction value included in an instruction value pattern in accordance with an air conditioning operation mode selected from the air conditioning operation mode B or the air conditioning operation mode C. In a case that the instruction is manual air conditioning timer setting, the air conditioning controller 124 instructs the air conditioning device 80 to indicate an instruction value in accordance with a set time of a manual air conditioning timer. In a case that the instruction is a notification indicating that a remote air conditioning is not available due to battery shortage, the air conditioning controller 124 instructs the air conditioner 80 not to perform an air conditioning operation (or does not instruct the air conditioner 80).

[Flowchart]

Figure 14:
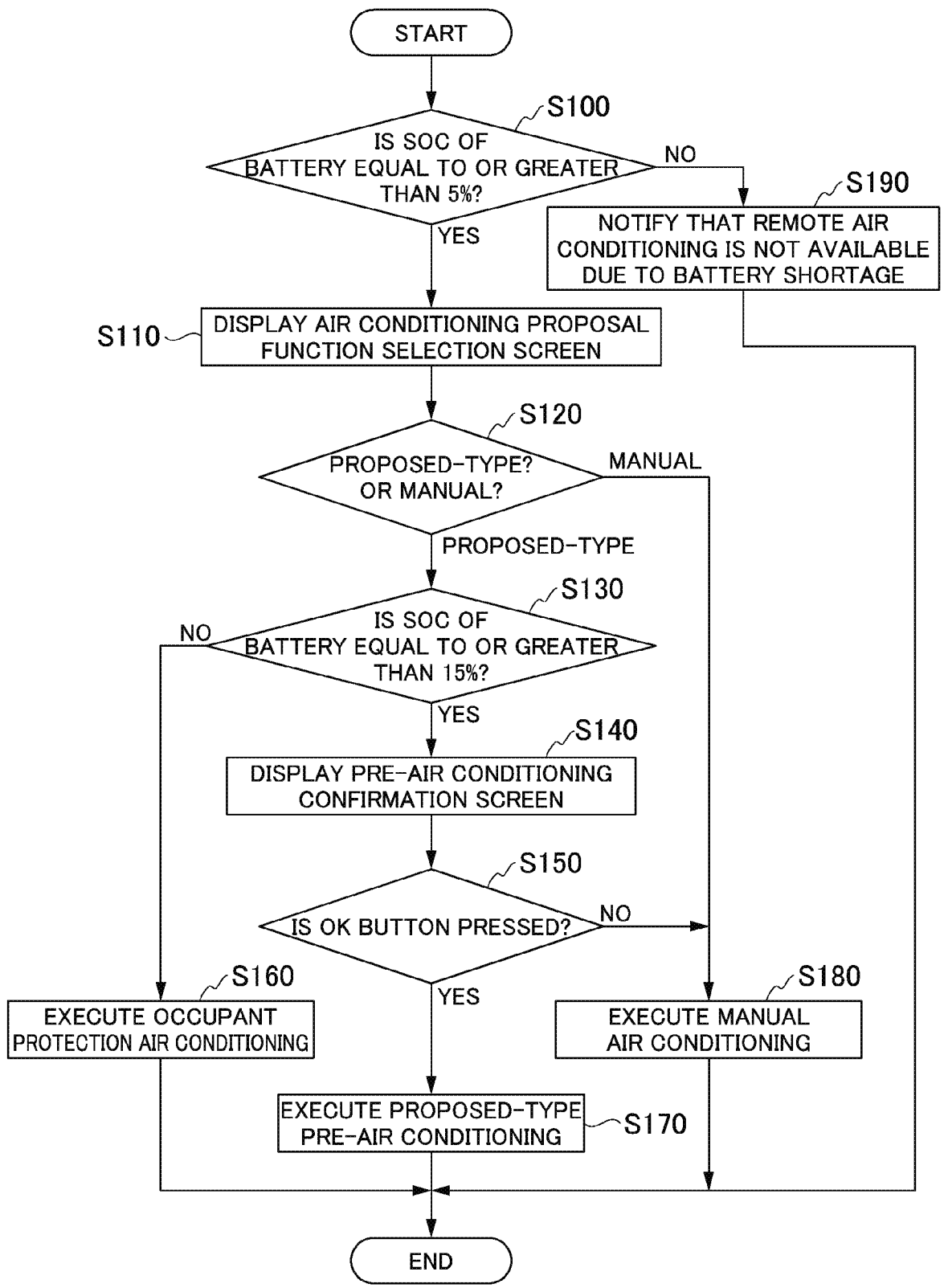
FIG. 14 is a flowchart which shows an example of a flow of processing executed by the pre-air conditioning proposal unit.

FIG. 14 is a flowchart which shows an example of a flow of processing executed by the pre-air conditioning proposal unit 123.

First, the pre-air conditioning proposal unit 123 acquires an SOC of the battery 40 calculated by the battery and VCU controller of the controller 36, and determines whether the SOC of the battery 40 is equal to or greater than a first predetermined value (for example, 5%) (step S100). If it is determined that the SOC of the battery 40 is equal to or greater than the first predetermined value, the pre-air conditioning proposal unit 123 displays an air conditioning proposal function selection screen shown in FIG. 12 (step S110), and the pre-air conditioning proposal unit 123 determines whether a driver has pressed the proposed-type pre-air conditioning execution button 514 (recommended pre-air conditioning) or the manual air conditioning ON button 516 (manual air conditioning ON) (step S120).

If it is determined that the driver has pressed the proposed-type pre-air conditioning execution button 514 (recommended pre-air conditioning) in step S120, the pre-air conditioning proposal unit 123 acquires the SOC of the battery 40 calculated by the battery and VCU controller of the controller 36, and determines whether the SOC of the battery 40 is equal to or greater than a second predetermined value (for example 15%) (step S130). If it is determined that the SOC of the battery 40 is equal to or greater than the second predetermined value in step S130, the pre-air conditioning proposal unit 123 displays a pre-air conditioning confirmation screen shown in FIG. 13 (step S140), and determines whether the driver has pressed the approval button 520 or the cancel button 522 (step S150).

If it is determined that the driver has pressed the approval button 520 in step S150, the pre-air conditioning proposal unit 123 outputs an instruction value associated with the proposed-type pre-air conditioning display 518 to the air conditioning controller 124, thereby executing proposed-type pre-air conditioning (step S170) and ending the processing of the present flowchart.

If it is determined that the SOC of the battery 40 is not equal to or greater than the second predetermined value in step S130, the pre-air conditioning proposal unit 123 outputs an instruction value included in the instruction value pattern according to the air conditioning operation mode A to the air conditioning controller 124, thereby executing occupant protection air conditioning (step S160) and ending the processing of the present flowchart.

In a case that it is determined that the driver has pressed the manual air conditioning ON button 516 (manual air conditioning ON) in step S120, or in a case that it is determined that the driver has pressed the cancel button 522 in step S150, the pre-air conditioning proposal unit 123 displays a timer setting screen not shown in the information terminal 510, causes the driver to input a timer time, a setting mode, a temperature, and the like, and outputs an instruction value in accordance with the input timer time, setting mode, temperature, and the like to the air conditioning controller 124, thereby executing a manual air conditioning operation (step S180) and ending the processing of the present flowchart.

In a case that it is determined that the SOC of the battery 40 is equal to or greater than the first predetermined value in step S100, the pre-air conditioning proposal unit 123 performs the notification indicating that remote air conditioning is not available due to battery shortage on the information terminal 510 via the air conditioning control service server 500 (step S190), and ends the processing of the present flowchart.

Figure 15:
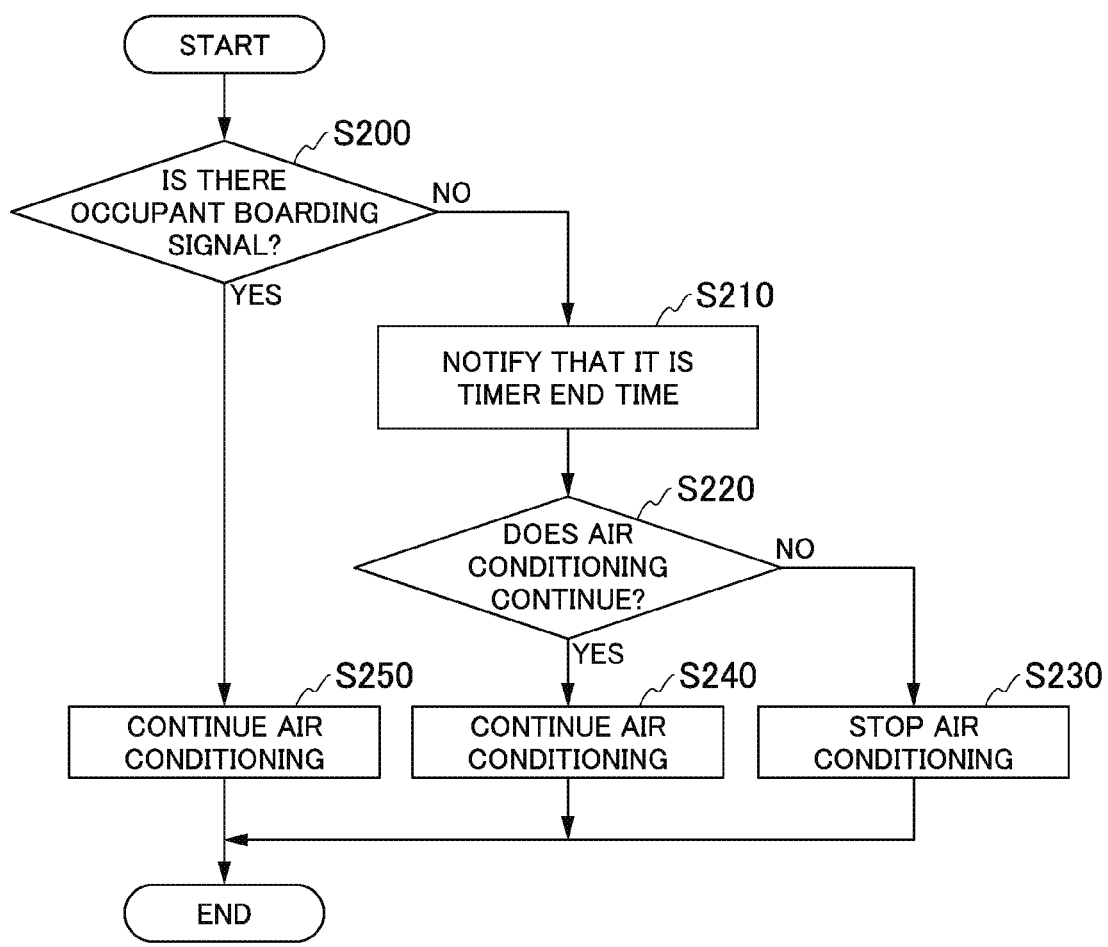
FIG. 15 is a flowchart which shows an example of a flow of processing executed by an air conditioning controller.

FIG. 15 is a flowchart which shows an example of a flow of processing executed by the air conditioning controller 124. The processing of the present flowchart is executed in a case that any one of the manual air conditioning operation and the proposed-type pre-air conditioning is performed by the pre-air conditioning proposal unit 123, and in a case that the timer end time is reached. The air conditioning controller 124 performs control such that the air conditioning operation starts at a time in a case that an occupant does not get on the vehicle in the proposed-type pre-air conditioning and the manual air conditioning operation. The air conditioning controller 124 performs control such that the air conditioning operation is stopped in a case that the occupant does not get on the vehicle even in a case that a predetermined time has elapsed since the air conditioning operation started. A time at which the air conditioning operation is stopped after this predetermined time elapses is referred to as the timer end time. The timer end time may be explicitly set by the driver via the information terminal 510 and may be set by the air conditioning controller 124, and any initial value may also be set in advance. For example, since "operation time:20 minutes" is set in pre-air conditioning setting in the air conditioning proposal function selection screen shown in FIG. 12, 20 minutes after a start of air conditioning according to the proposed-type pre-air conditioning is the timer end time.

First, the air conditioning controller 124 determines whether an occupant boarding signal generated based on the signal output from the door sensor that detects an open state of a door not shown, the human detecting sensor, or the like is received (step S200).

In a case that it is determined that an occupant boarding signal is received in step S200, the air conditioning controller 124 causes the air conditioning device 80 to continue the air conditioning operation (step S250) and ends the processing of the present flowchart.

In a case that it is determined that an occupant boarding signal is not received in step S200, the air conditioning controller 124 notifies the information terminal 510 via the air conditioning control service server 500 that it is a timer end time (step S210), and determines whether the driver instructs to continue the air conditioning operation (step S220).

In a case that it is determined that the driver instructs to continue the air conditioning operation in step S220, the air conditioning controller 124 causes the air conditioning device 80 to continue the air conditioning operation (step S240) and ends the processing of the present flowchart.

In a case that it is determined that the driver does not instruct to continue the air conditioning operation in step S220, the air conditioning controller 124 causes the air conditioning device 80 to stop the air conditioning operation (step S230) and ends the processing of the present flowchart.

[Profile Generation]

Figure 16:
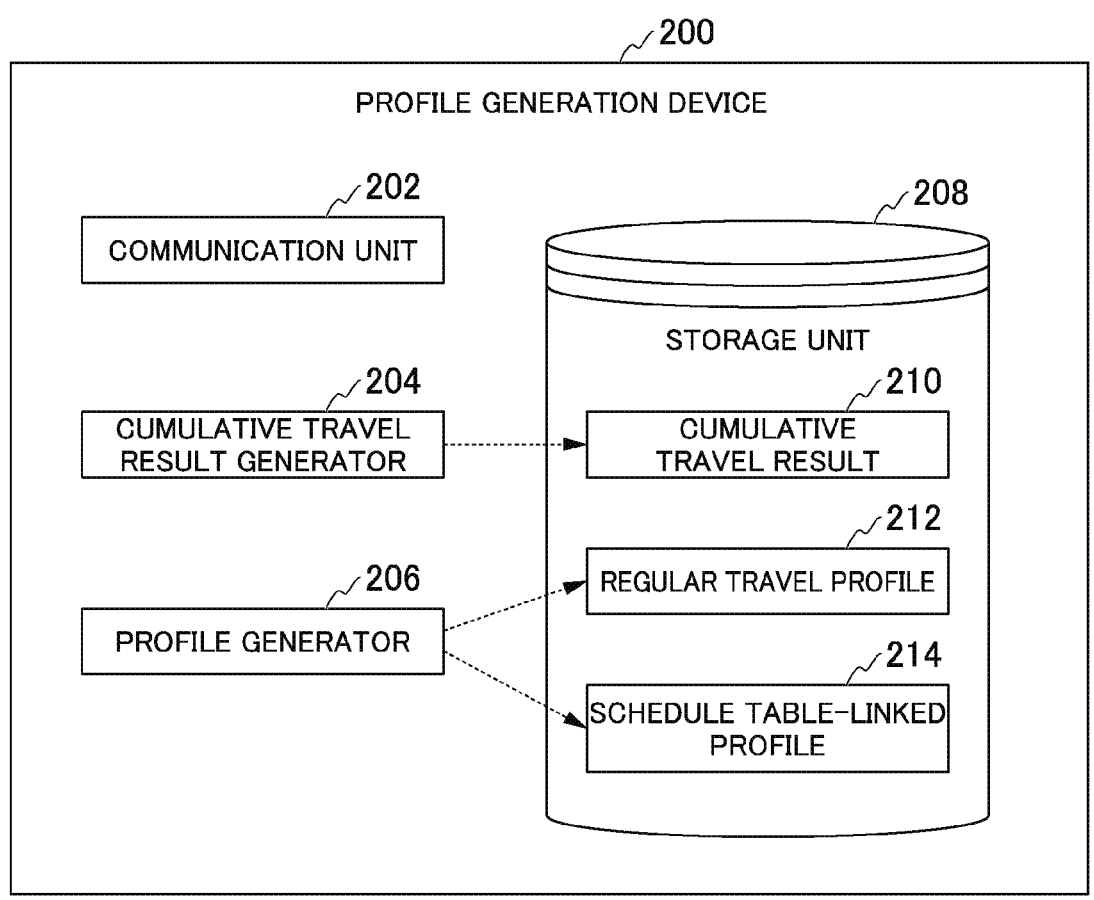
FIG. 16 is a diagram which shows a functional configuration of a profile generation device.

Hereinafter, a profile generation device 200 which generates a profile will be described. FIG. 16 is a diagram which shows a functional configuration of the profile generation device 200. In the following example, the profile generation device 200 is described as being provided separately from the vehicle 10, but it may be mounted on the vehicle 10.

The profile generation device 200 includes, for example, a communication unit 202, a cumulative travel result generator 204, a profile generator 206, and a storage unit 208. The storage unit 208 stores, for example, a cumulative travel result 210, a regular travel profile 212, and a schedule table-linked profile 214.

The communication unit 202 communicates with other server devices, a navigation device of the vehicle 10, or the like via the network NW and acquires the travel results of the vehicle 10. The cumulative travel result generator 204 stores the obtained travel results in the storage unit 208 as the cumulative travel result 210 to be described below. The cumulative travel result generator 204 may update the cumulative travel result 210 by acquiring the travel results of the vehicle 10 regularly, or may update the cumulative travel result 210 by acquiring the travel results of the vehicle 10 in accordance with a predetermined operation such as a travel start or a travel stop of the vehicle 10.

Figure 17:
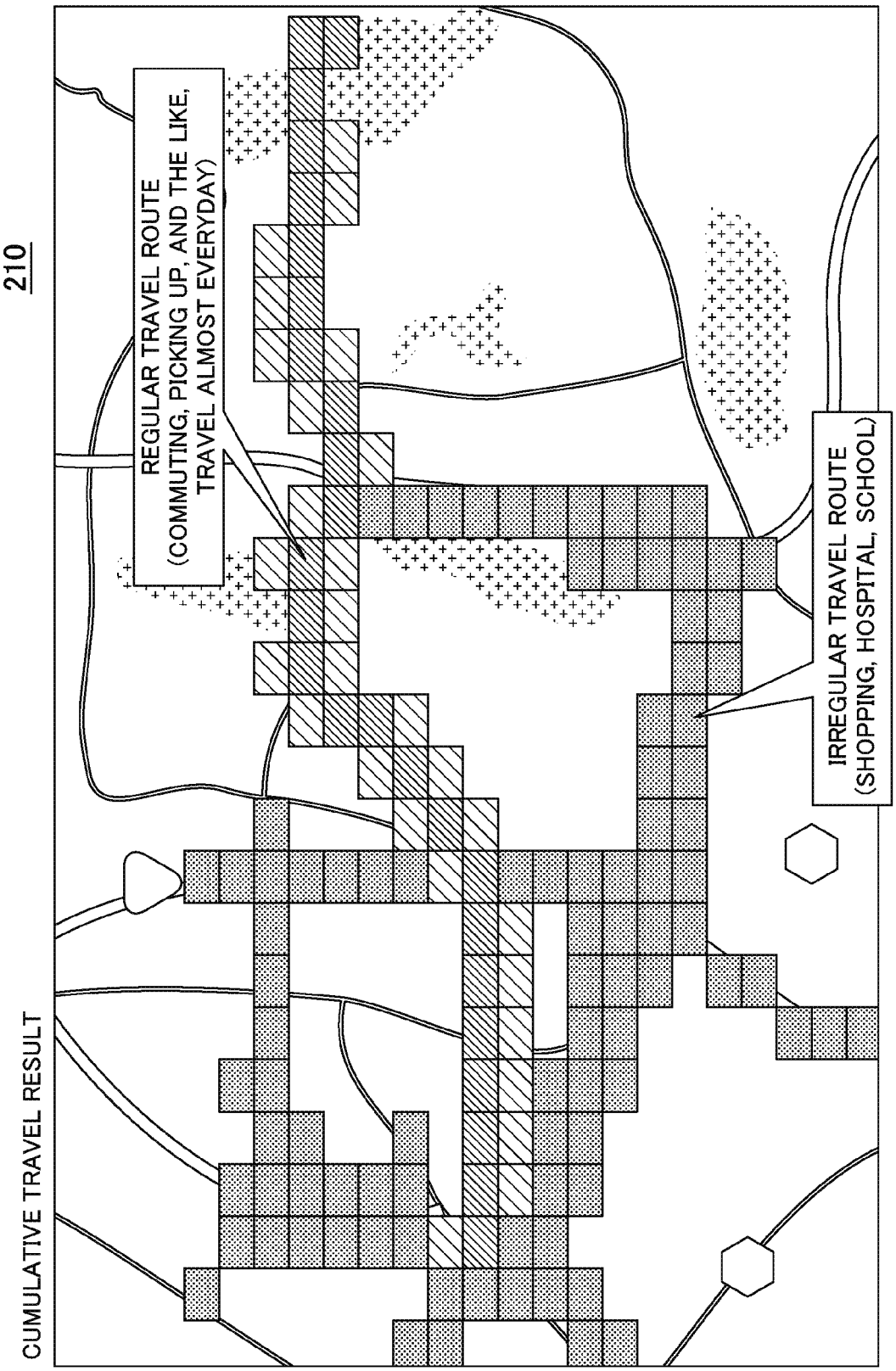
FIG. 17 is an example in which information indicated by cumulative travel results is graphically expressed.

The cumulative travel result 210 is a cumulative record of the past travel routes of the vehicle 10, and it indicates routes, transit points, destinations, frequencies, travel time, and the like in which the vehicle 10 has traveled. FIG. 17 is an example in which information indicated by the cumulative travel result 210 is graphically expressed. An actual cumulative travel result 210 is, for example, a set of data indicating travel routes of the vehicle 10 represented by unique numbers which indicate links and nodes representing roads used in map information stored in the map information storage unit 64, coordinates of latitude and longitude, and the like. The actual cumulative travel result 210 may be realized as, for example, a text format, various tabular format data, a binary format database, or the like. The cumulative travel result 210 may include a travel distance, a passing time, a section speed, an average speed, a place name, a point of interest (POI) information, and the like in addition to data indicating travel routes.

The profile generator 206 reads the cumulative travel result 210 from the storage unit 208, accesses the air conditioning control service server 500 via the network NW, acquires an action schedule of the schedule table which the driver has registered in advance using the information terminal 510, and generates, for example, the regular travel profile 212 and the schedule table-linked profile 214 by performing statistical processing such as machine leaning or a regression analysis on the cumulative travel result 210 and the action schedule of the schedule table. The profile generator 206 may generate the regular travel profile 212 and the schedule table-linked profile 214 by applying a predetermined algorithm or a predetermined analysis method. The communication unit 202 sends the generated regular travel profile 212 and schedule table-linked profile 214 to the air conditioning control device 100. The air conditioning control device 100 acquires the regular travel profile 212 and the schedule table-linked profile 214 generated by the profile generator 206, and causes the storage unit 160 to store the acquired regular travel profile 212 and schedule table-linked profile 214 as the regular travel profile 162 and the schedule table-linked profile 164. The generated regular travel profile 212 and the schedule table-linked profile 214 may be sent to the air conditioning control device 100 via the air conditioning control service server 500, and the profile generation device 200 may be implemented as a part of functions of the air conditioning control service server 500. Functions of the profile generation device 200 may be implemented as a part of the functions of the air conditioning control device 100.

[Flowchart]

Figure 18:
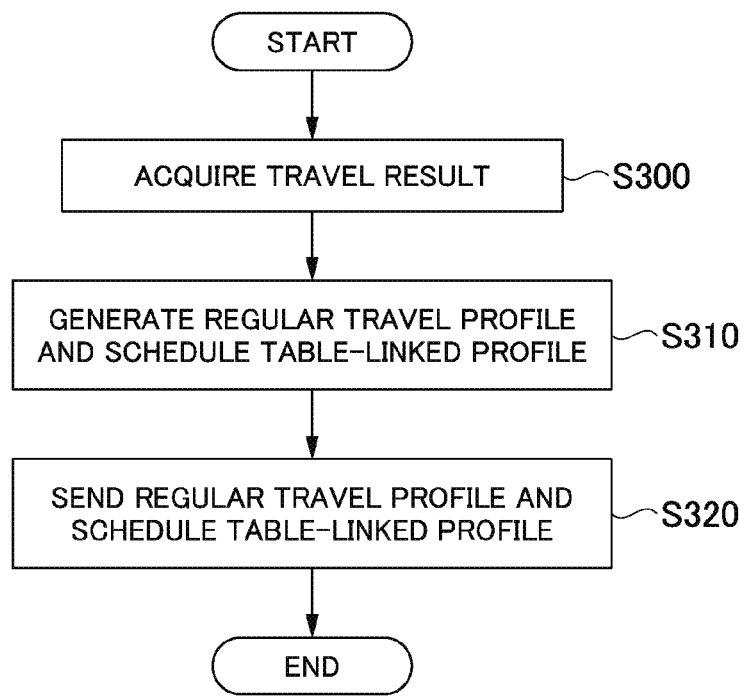
FIG. 18 is a flowchart which shows a flow of processing executed by the profile generation device.

FIG. 18 is a flowchart which shows a flow of processing executed by the profile generation device 200. First, the cumulative travel result generator 204 communicates with other server devices or a navigation device of the vehicle 10 and the like via the network NW, acquires a travel result of the vehicle 10, and causes the result to be stored in the storage unit 208 as the cumulative travel result 210 (step S300).

Next, the profile generator 206 reads the cumulative travel result 210 from the storage unit 208, and generates the regular travel profile 212 and the schedule table-linked profile 214 by, for example, performing statistical processing such as machine learning or a regression analysis (step S310).

Next, the communication unit 202 sends the generated regular travel profile 212 and schedule table-linked profile 214 to the air conditioning control device 100 (step S320) and processing of the present flowchart ends.

In general air conditioning control of a vehicle, the action schedule of an occupant may not be considered. For example, if an occupant gets off a vehicle temporarily to drop by a store and the like, and gets on the vehicle again after finishing a job, since air conditioning is not appropriately controlled, discomfort of the occupant may increase in some cases. In the general air conditioning control of a vehicle, since control based on an action of an occupant, a heat load, and the amount of power consumption to the destination is not performed, a lack of electric energy for traveling may limit the air conditioning operation or may increase the discomfort of an occupant in some cases.

On the other hand, the air conditioning control device 100 of the present embodiment can suppress power consumption and improve the comfort of an occupant by performing control as follows.

Figure 19:
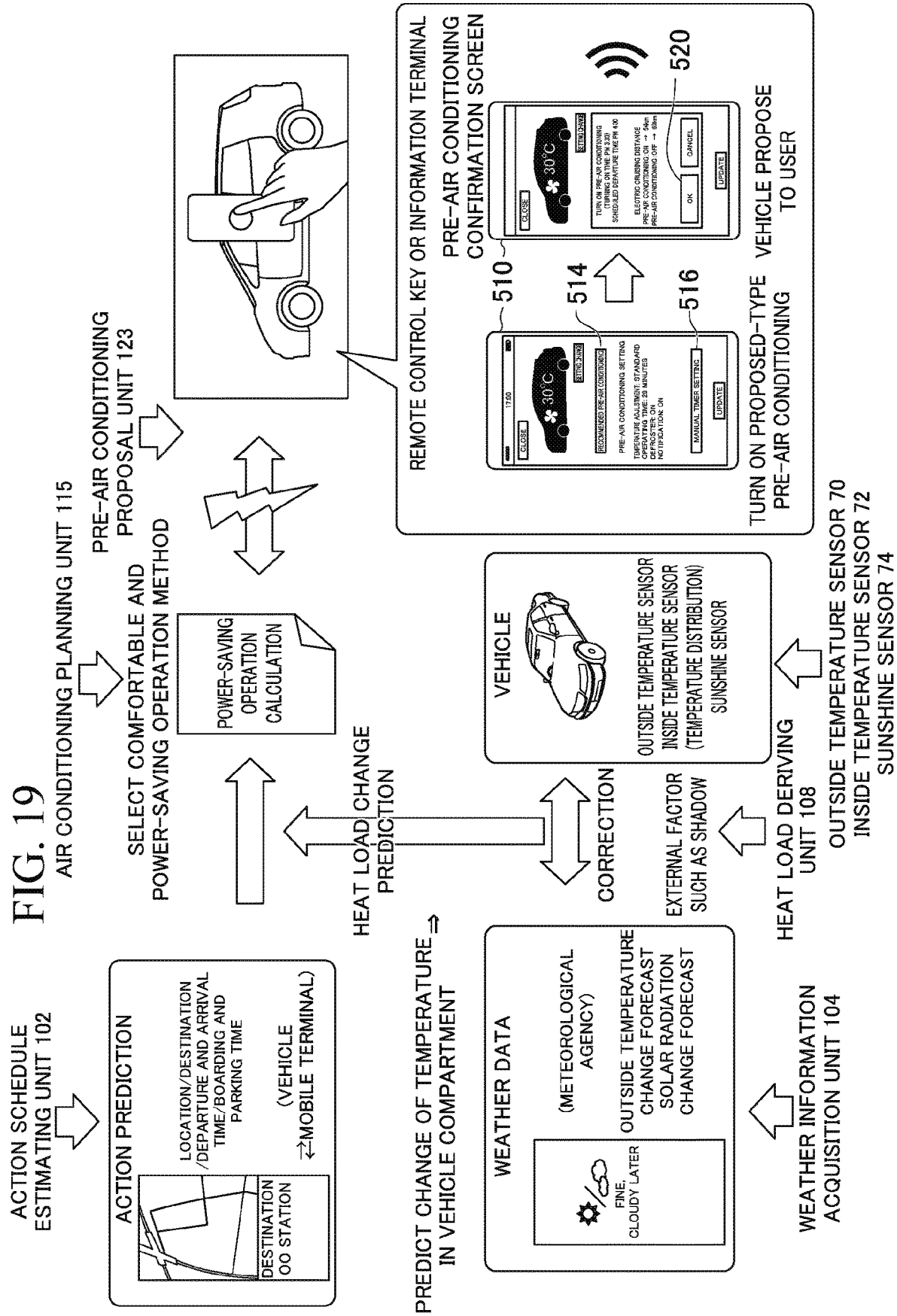
FIG. 19 is a conceptual diagram of processing of the air conditioning control device.

FIG. 19 is a conceptual diagram of processing of the air conditioning control device 100. The air conditioning planning unit 115 of the air conditioning control device 100 of the embodiment selects a comfortable and power-saving instruction value pattern among the instruction value patterns given to the air conditioning device 80 on the basis of heat load change prediction obtained by correcting a heat load derived on the basis of action prediction of the driver of the vehicle 10 estimated by the action schedule estimating unit 102 and weather information such as an outside temperature change forecast, a solar radiation change forecast, a humidity change forecast, a wind change forecast, and a weather forecast using detected values of various sensors (the outside temperature sensor 70, the inside temperature sensor 72, and the sunshine sensor 74) of the vehicle 10. The pre-air conditioning proposal unit 123 proposes pre-air conditioning to the driver of the vehicle 10 by notifying the information terminal 510 of an instruction value pattern selected by the air conditioning planning unit 115. The driver of the vehicle 10 presses the proposed-type pre-air conditioning execution button 514 (recommended pre-air conditioning) in the information terminal 510, and presses the approval (OK) button 520 in a pre-air conditioning confirmation screen asking whether to approve the instruction value pattern proposed by the pre-air conditioning proposal unit 123. As a result, the driver of the vehicle 10 can cause the air conditioning device 80 to execute a comfortable and power-saving air conditioning operation only by answering whether to approve (OK) recommended pre-air conditioning (recommended pre-air conditioning) notified from the pre-air conditioning proposal unit 123 without manually setting a timer or performing a remote control operation.

Figure 20:
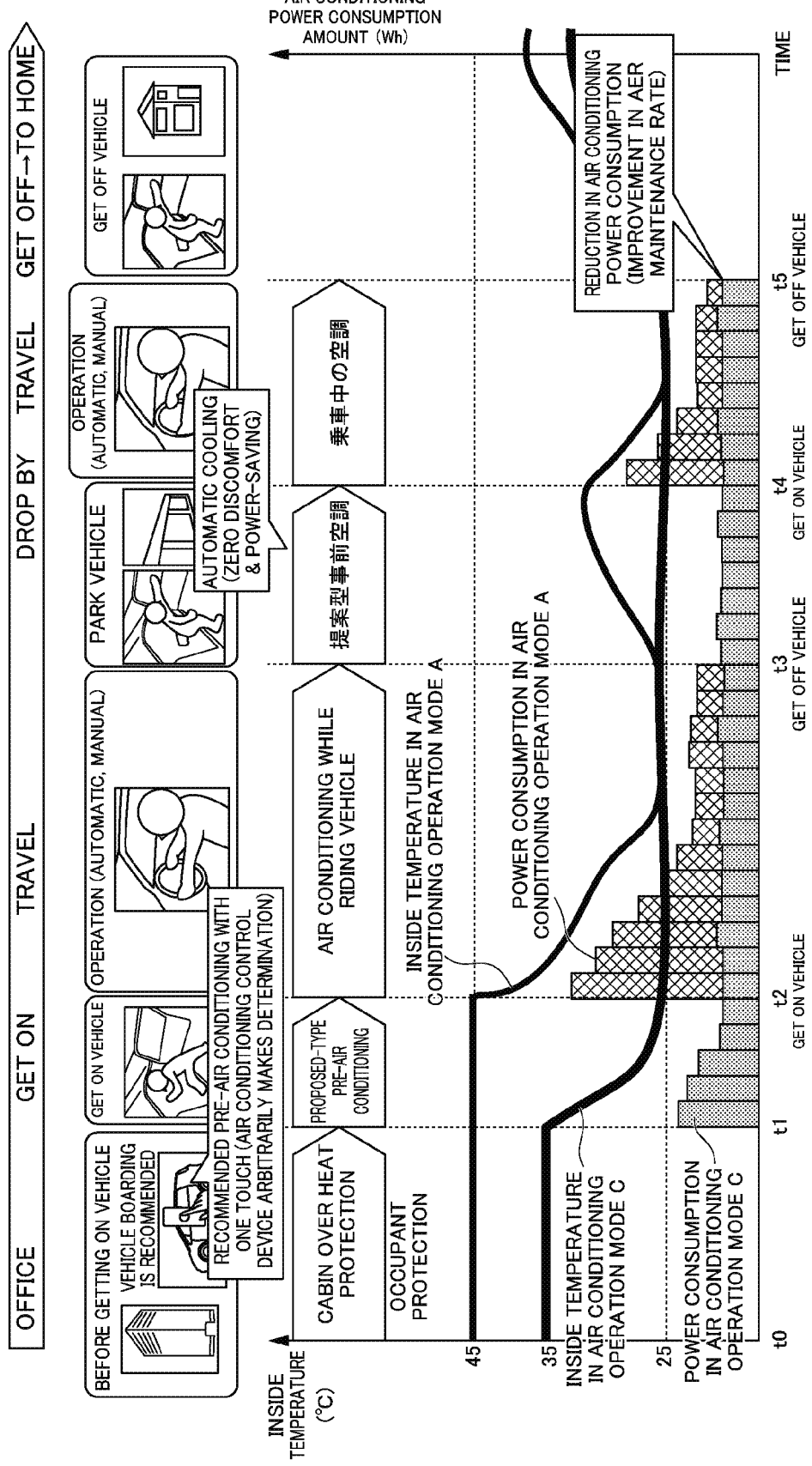
FIG. 20 is a diagram which shows an example of an air conditioning operation performed by the air conditioning control device according to the embodiment.

FIG. 20 is a diagram which shows an example of an air conditioning operation performed by the air conditioning control device 100 of the embodiment. FIG. 20 is a diagram which shows a time change of the inside temperature from a driver's getting on the vehicle 10 at a boarding time to arrival at a destination by traveling along a travel route in each of the air conditioning operation mode A and the air conditioning operation mode C. As described above, in the air conditioning operation mode A, the air conditioning control device 100 only performs the occupant protection air conditioning, and does not perform the holding air conditioning and the pre-air conditioning. In the air conditioning operation mode C, the air conditioning control device 100 performs all of the occupant protection air conditioning, the holding air conditioning, and the pre-air conditioning.

At a time t0, in the air conditioning operation mode A, the occupant protection air conditioning is performed, and a temperature in the vehicle compartment of the vehicle 10 is kept to around 45 [° C.] to prevent the temperature in the vehicle compartment of the vehicle 10 from excessively rising. In the air conditioning operation mode A, the holding air conditioning is performed, and a rapid air conditioning operation is avoided to efficiently perform an air conditioning operation by causing the air conditioning device 80 to perform the air conditioning operation in advance and keeping the temperature in the vehicle compartment of the vehicle 10 to a predetermined temperature (for example, 35 [° C.]).

On the other hand, at a time t1, in the air conditioning operation mode C, the pre-air conditioning is started, and the temperature in the vehicle compartment of the vehicle 10 starts to fall. At a time t2, it is assumed that the driver gets on the vehicle. From the time t2 and thereafter, in the air conditioning operation mode A, the air conditioning operation is rapidly performed and the temperature in the vehicle compartment of the vehicle 10 starts to fall.

At a time t3, it is assumed that the driver gets off the vehicle. In the air conditioning operation mode C, the temperature in the vehicle compartment of the vehicle 10 is kept by the holding air conditioning. In the air conditioning operation mode A, since the air conditioning device 80 is stopped, the temperature in the vehicle compartment of the vehicle 10 starts to rise. At a time t4, it is assumed that the driver gets on the vehicle again. From the time t4 and thereafter, the air conditioning operation is rapidly performed and the temperature in the vehicle compartment of the vehicle 10 starts to fall in the air conditioning operation mode A. At a time t5, it is assumed that the vehicle 10 arrives at the destination and the IG of the vehicle is turned off.

The air conditioning operation mode A and the air conditioning operation mode C are compared in power consumption. In the air conditioning operation mode A, in a case that the driver gets on the vehicle 10 and the IG is turned on at the time t2, the air conditioning device 80 rapidly performs the air conditioning operation, and consumes very large power consumption. In the air conditioning operation mode A, in a case that the driver gets on the vehicle 10 again and the IG is turned on at the time t4, the air conditioning device 80 rapidly performs the air conditioning operation and consumes very large power consumption. On the other hand, in the air conditioning operation mode C, the air conditioning device 80 consumes power consumption at the time of performing the air conditioning operation according to the holding air conditioning at a time t0. However, the power consumption of the air conditioning device 80 according to the holding air conditioning in the air conditioning operation mode C is smaller than the power consumption of the air conditioning device 80 according to the rapid air conditioning operation in a case that the driver gets on the vehicle in the air conditioning operation mode A.

Therefore, if the air conditioning operation mode A and the air conditioning operation mode C are compared, in the example of FIG. 20, the total amount of power consumption from the driver's getting on the vehicle 10 at a boarding time to arrival at the destination by traveling along the travel route in the air conditioning operation mode C is smaller than in the air conditioning operation mode A. That is, it is possible to improve the comfort of an occupant and to suppress an increase in power consumption by the proposed-type pre-air conditioning performed by the air conditioning control device 100 of the embodiment.

As shown in FIG. 19, according to the air conditioning control device 100 of the embodiment, it is possible to cause the air conditioning device 80 to execute a comfortable and power-saving air conditioning operation with one touch just by the driver of the vehicle 10 answering whether to approve (OK) recommended pre-air conditioning (recommended pre-air conditioning) notified from the pre-air conditioning proposal unit 123. Furthermore, the air conditioning device 80 of the vehicle 10 can perform an air conditioning operation which is comfortable for a driver and power-saving through a series of actions from in a case that the driver stays outside a vehicle such as an office and parks the vehicle 10 to in a case that the driver gets on the vehicle 10 again and returns home after getting on the vehicle 10 to travel and parking the vehicle 10 at a convenience store at a transit point on the way to get off it. That is, according to the air conditioning control device 100 of the embodiment, it is possible to perform control on a comfortable and power-saving seamless air conditioning operation without performing a complicated manual operation by the driver of the vehicle 10. As a result, a total amount of power consumption of the air conditioning device 80 of the vehicle 10 from the pre-air conditioning of the vehicle 10 that is parked in a case that the driver stays outside the vehicle to traveling, getting off at a transit point, and traveling to home from the transit point can be reduced. That is, it is possible to realize an improvement in a maintenance rate of all electric range (AER).

In the embodiment described above, the driver of the vehicle 10 presses the proposed-type pre-air conditioning execution button 514 (recommended pre-air conditioning) in the information terminal 510 and presses the approval (OK) button 520 in the pre-air conditioning confirmation screen asking whether to approve an instruction value pattern proposed by the pre-air conditioning proposal unit 123, and thereby the air conditioning control device 100 of the vehicle 10 causes the air conditioning device 80 to perform pre-air conditioning. However, the pre-air conditioning proposal unit 123 does not necessarily urge the driver of the vehicle 10 to press the approval (OK) button 520 by causing the information terminal 510 to display the pre-air conditioning confirmation screen. For example, the air conditioning control device 100 may automatically cause the air conditioning device 80 to perform pre-air conditioning or holding air conditioning without the pre-air conditioning proposal unit 123 asking the driver of the vehicle 10 whether to perform pre-air conditioning. In this case, the driver of the vehicle 10 may set in advance whether the air conditioning control device 100 automatically causes the air conditioning device 80 to perform pre-air conditioning or holding air conditioning without asking it by displaying the pre-air conditioning confirmation screen.

In the embodiment described above, the action schedule estimating unit 102 estimates the departure location, boarding time, travel route, desired arrival time, destination, and staying time of the driver of the vehicle 10 on the basis of a schedule of the driver registered in the schedule table in advance by the driver, but may perform the estimation on the basis of schedules registered in the schedule table by other drivers. For example, in a case that the vehicle 10 is a company car, the estimation is performed on the basis of the schedules registered in the schedule table by other employees. The action schedule estimating unit 102 can generate the regular travel profile 162 and the schedule table-linked profile 164 on the basis of a correspondence between travel results of a number of unspecified people and the schedules registered in the schedule table, and the action schedule estimating unit 102 can perform the estimation. Since action schedules of public facilities and commercial facilities visited by a number of unspecified people are highly likely to have similarity, estimation performance can be improved by the action schedule estimating unit 102 performing estimation on the basis of data of a number of unspecified people. That is, the action schedule estimating unit 102 may estimate a boarding time at which the driver gets on the vehicle 10, a destination, and a route on the basis of action history of another person that is similar to the action history of the driver of the vehicle 10 or travel history of another vehicle that is similar to the travel history of the vehicle 10.

In the embodiment described above, description has been performed on the premise that the air conditioning device 80 performs a cooling operation in summer. However, the holding air conditioning and the pre-air conditioning of the air conditioning control device 100 can also be applied to a heating operation in winter. In a case that the heating operation is performed in winter, the air conditioning control device 100 may derive an instruction value pattern in which a defroster is temporarily caused to operate strongly to raise the inside temperature to dissolve and remove frost and snow adhering to glasses of the vehicle 10 in response to a decrease in the outside temperature while the vehicle 10 is parked before a start of traveling. In this case, the driver of the vehicle 10 can start traveling without removing the frost and snow on the glasses at the time of getting on the vehicle, and convenience is further improved in a case that the vehicle 10 is operated in winter. In this case, since the driver of the vehicle 10, unlike air conditioning with a remote control engine starter, a manual timer, or a remote control operation, does not perform manual setting each time and the air conditioning control device 100 automatically causes the air conditioning device 80 to perform an optimum air conditioning operation, the convenience is further improved at the time of operating the vehicle 10.

In the embodiment described above, it is assumed that the air conditioning device 80 adjusts a state of air in the vehicle compartment of the vehicle 10 such that a temperature in the vehicle compartment of the vehicle 10 matches an instruction value (temperature) given from the air conditioning control device 100. However, the instruction value given from the air conditioning control device 100 is not limited to the temperature. The instruction value given from the air conditioning control device 100 may be, for example, an instruction value for humidity, switching inside air circulation to outside air introduction, or the like. For example, the weather information acquisition unit 104 can acquire weather information including a wind change forecast, a pollen forecast, a yellow sand forecast, and the like, a scattered object deriving unit not shown, like the heat load deriving unit 108, can calculate a predicted scattered object value, the air conditioning planning unit 115 can select an instruction value pattern for switching the inside air circulation to outside air introduction on the basis of the calculated predicted scattered object value, and the air conditioning device 80 can perform an air conditioning operation in accordance with the instruction value given from the air conditioning control device 100. In this case, the instruction value given from the air conditioning control device 100 may include at least one of an instruction value for the temperature and the instruction value for switching inside air circulation to outside air introduction. As a result, in addition to adjustment in temperature of air in the vehicle compartment, it is possible to decrease an amount of scattered objects taken into the vehicle compartment and to reduce discomfort of an occupant by switching an air intake of the air conditioning device 80 to inside air circulation in a case that there are many scattered objects such as pollen and yellow sand. In this case, instead of the heat load correcting unit 112, a scattered object correcting unit not shown may be included. The scattered object correcting unit corrects a predicted scattered object value on the basis of an actual amount of scattering of scattered objects such as pollen which is acquired by a scattered object sensor such as a pollen sensor not shown, thereby performing prediction with high accuracy.

The air conditioning device 80 may include a humidifier, and may adjust the humidity of air in the vehicle compartment using the humidifier in addition to adjusting the temperature of air in the vehicle compartment. In this case, the air conditioning device 80 performs humidification on the air in the vehicle compartment using the humidifier as well as the switching inside air circulation to outside air introduction on the basis of the predicted scattered object value described above, and thereby it is possible to reduce the discomfort of an occupant due to scattered objects such as pollen or dryness in the vehicle compartment of the vehicle 10.

The weather information acquisition unit 104 can acquire weather information including a humidity change forecast, and the like, a humidity deriving unit not shown, like the heat load deriving unit 108, can calculate a predicted humidity value, the air conditioning planning unit 115 can select an instruction value pattern for the air conditioning device 80 on the basis of the calculated predicted humidity value, and the air conditioning device 80 can perform a humidification operation using the humidifier in accordance with the instruction value given from the air conditioning control device 100. As a result, it is possible to alleviate the discomfort of an occupant by increasing humidity of the air in the vehicle compartment using the humidifier in a case that the air is dry in winter or the like. The air conditioning control device 100 can control the air conditioning device 80 on the basis of one or more of the predicted heat load value, the predicted scattered object value, and the predicted humidity value described above. Therefore, according to the air conditioning control device 100 of the embodiment, it is possible to control a comfortable and power-saving seamless air conditioning operation in which the humidity and the switching inside air circulation to outside air introduction in addition to the temperature are automatically controlled without a complicated manual operation performed by the driver of the vehicle 10.

The vehicle 10 may include a solar panel not shown. In this case, the air conditioning planning unit 115 may derive an instruction value pattern in consideration of the amount of power generation of the solar panel. For example, in a case that the amount of power generation of the solar panel is expected, energy can be effectively utilized by deriving an instruction value pattern that causes the air conditioning device 80 to operate actively and thereby efficiently using the amount of power generation of the solar panel.

[Hardware Configuration]

Figure 21:
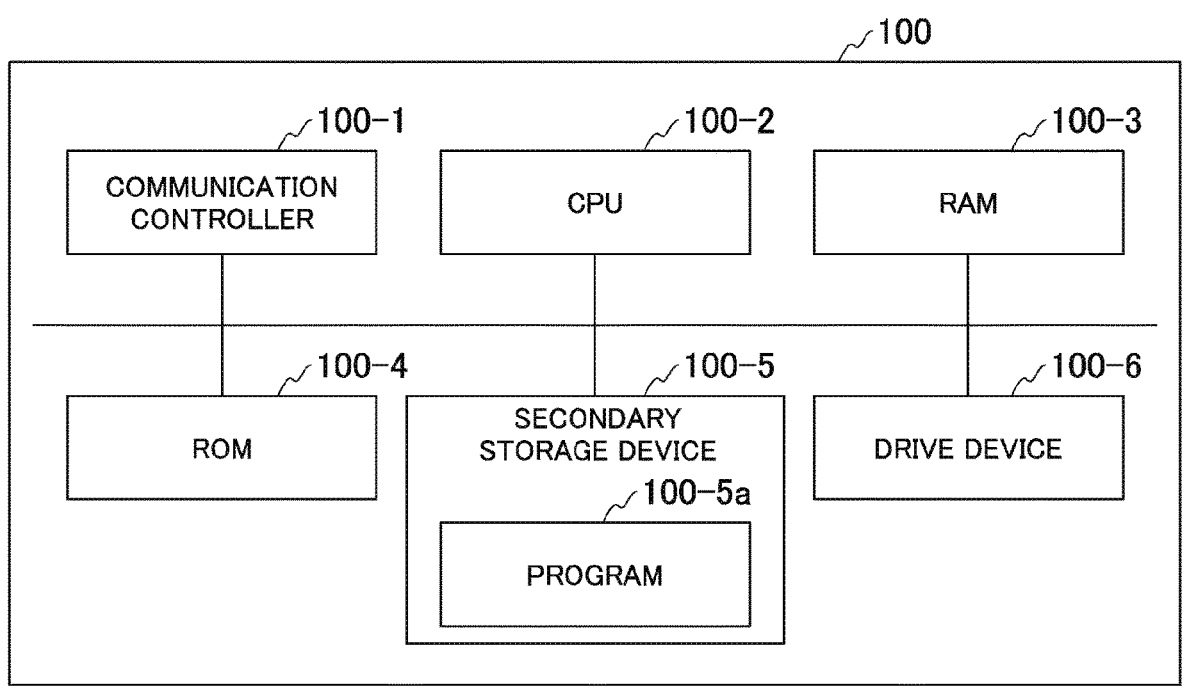
FIG. 21 is a diagram which shows an example of a hardware configuration of each part of the air conditioning control device of the embodiment.

The air conditioning control device 100 of the vehicle 10 of the embodiment described above is realized, for example, by a configuration of hardware as shown in FIG. 21. FIG. 21 is a diagram which shows an example of a hardware configuration of each part of the air conditioning control device 100 of the embodiment.

The air conditioning control device 100 is configured to include a communication controller 100-1, a CPU 100-2, a RAM 100-3, a ROM 100-4, a secondary storage device 100-5 such as a flash memory or an HDD, and a drive device 100-6 which are connected to one another by an internal bus or a dedicated communication line. A portable storage medium such as an optical disc is mounted on the drive device 100-6. A program 100-5*a* stored in the secondary storage device 100-5 is expanded to the RAM 100-3 by a DMA controller (not shown) or the like and is executed by the CPU 100-2, and thereby the air conditioning control device 100 is realized. A program referred to by the CPU 100-2 may be stored in the portable storage medium mounted on the drive device 100-6, and may also be downloaded from another device via the network NW.

According to the embodiments described above, it is possible to suppress an increase in power consumption and to improve the comfort of an occupant.

As described above, although aspects for implementing the present invention have been described using embodiments, the present invention is not limited to these embodiments, and various modifications and substitutions can be added within a range not departing from the gist of the present invention.

What is claimed is:

1. An air conditioning control device comprising:
a central processing unit that executes an air conditioning control program stored in memory, wherein execution of the air conditioning control program causes the air conditioning control device to perform operations, the operations comprising:
acquiring environmental measurement information obtained by measuring a current environment around a host vehicle;
acquiring an action schedule of a user based on past or future schedule table information of the user of the host vehicle, and estimating a boarding time at which the user gets on the host vehicle, a destination, and a route based on the action schedule;
deriving instruction value patterns for a respective plurality of air conditioning operation modes, each instruction value pattern of the instruction value patterns comprising a first instruction value for an air conditioning device of the host vehicle to match a state of the host vehicle to a target state at the boarding time, a second instruction value for the air conditioning device to match the state of the host vehicle to the target state on a travel route toward the destination, and a third instruction value for the air conditioning device to match the state of the host vehicle to the target state in a case that the user gets on after getting off the vehicle while arriving at the destination, based on the environmental measurement information and at least one of the boarding time, the destination, or the route;
deriving power consumption of the air conditioning device for each of the instruction value patterns of the plurality of air conditioning operation modes in a case in which the air conditioning device is operated according to each of the instruction value patterns;
selecting a selected instruction value pattern, of the instruction value patterns, in which the power consumption is equal to or lower than a predetermined threshold value or is minimized; and
executing an air conditioning operation mode, of the plurality of air conditioning operating modes, corresponding to the selected instruction value pattern based on the selected instruction value pattern.

2. The air conditioning control device according to claim 1, wherein the operations further comprise:
acquiring environmental prediction information in a travel route of the host vehicle for a future time,
wherein the deriving of the instruction value patterns comprises deriving an instruction value pattern based on the environmental prediction information and the environmental measurement information.

3. The air conditioning control device according to claim 2,
wherein the environmental prediction information includes at least one of an outside temperature change forecast, a solar radiation change forecast, a humidity change forecast, a wind change forecast, a weather forecast, a pollen forecast, or a yellow sand forecast.

4. The air conditioning control device according to claim 1,
wherein the environmental measurement information includes at least one of an outside temperature that is a temperature outside the host vehicle, an inside temperature that is a temperature in a vehicle compartment of the host vehicle, or an amount of sunshine to the host vehicle.

5. The air conditioning control device according to claim 1, wherein the operations further comprise:
setting the predetermined threshold value based on a determined amount of usable electric energy, travel electric energy used by the host vehicle to travel to the destination, and stored electric energy stored in a secondary battery mounted on the host vehicle.

6. The air conditioning control device according to claim 1, wherein the operations further comprise:
generating a notification of the instruction value pattern derived by the deriving and receiving approval information indicating whether the user of the host vehicle approves the instruction value pattern indicated by the notification,
wherein the executing of the air conditioning operation mode comprises controlling an air conditioning device of the host vehicle based on the instruction value pattern in response to the receiving of the approval information.

7. The air conditioning control device according to claim 1, further comprising:

a storage unit configured to store a travel history profile of another vehicle, wherein the estimating comprises estimating the boarding time at which the user gets on the host vehicle, the destination, and the route based on an action history of a different user that is determined to be similar to an action history of the user stored in the storage unit or a travel history of another vehicle that is determined to be similar to a travel history of the host vehicle.

8. An air conditioning control method using a computer, comprising:

acquiring an action schedule of a user based on past or future schedule table information of the user of a host vehicle;

acquiring environmental measurement information obtained by measuring an environment around the current host vehicle;

estimating a boarding time at which the user gets on the host vehicle, a destination, and a route based on the action schedule;

deriving instruction value patterns for a respective plurality of air conditioning operation modes, each instruction value pattern of the instruction value patterns comprising a first instruction value for an air conditioning device of the host vehicle to match a state of the host vehicle to a target state at the boarding time, a second instruction value for the air conditioning device to match a state of the host vehicle to a target state on a travel route toward the destination, and a third instruction value for the air conditioning device to match a state of the host vehicle to a target state in a case that the user gets on after getting off the vehicle while arriving at the destination based on the environmental measurement information and the action schedule of the user;

deriving power consumption of the air conditioning device for each of the instruction value patterns of the plurality of air conditioning operation modes in a case that the air conditioning device is operated according to each of the instruction value patterns;

selecting a selected instruction value pattern, of the instruction value patterns, for which the power consumption is equal to or lower than a predetermined threshold value or is minimized; and executing an air conditioning operation mode, of the air conditioning operation modes, corresponding to the selected instruction value pattern based on the selected instruction value pattern.

9. The air conditioning control method of claim 8, further comprising:

acquiring environmental prediction information in a travel route of the host vehicle for a future time, wherein the deriving of the instruction value patterns comprises deriving an instruction value pattern based on the environmental prediction information.

10. A non-transitory computer-readable recording medium recording a vehicle control program causing an in-vehicle computer to:

acquire an action schedule of a user based on past or future schedule table information of the user of a host vehicle;

acquire environmental measurement information obtained by measuring an environment around the current host vehicle;

estimate a boarding time at which the user gets on the host vehicle, a destination, and a route based on the action schedule;

derive instruction value patterns for a respective plurality of air conditioning operation modes, each instruction value pattern of the instruction value patterns comprising a first instruction value for an air conditioning device of the host vehicle to match a state of the host vehicle to a target state at the boarding time, a second instruction value for the air conditioning device to match a state of the host vehicle to a target state on a travel route toward the destination, and a third instruction value for the air conditioning device to match a state of the host vehicle to a target state in a case that the user gets on after getting off the vehicle while arriving at the destination based on the environmental measurement information and the action schedule of the user;

derive power consumption of the air conditioning device for each of the instruction value patterns of the plurality of air conditioning operation modes in a case that the air conditioning device is operated according to each of the instruction value patterns;

select a selected instruction value pattern, of the instruction value patterns, for which the power consumption is equal to or lower than a predetermined threshold value or is minimized; and execute an air conditioning operation mode, of the air conditioning operation modes, corresponding to the selected instruction value pattern based on the selected instruction value pattern.

\* \* \* \* \*